(12) United States Patent
Ko et al.

(10) Patent No.: US 11,653,355 B2
(45) Date of Patent: May 16, 2023

(54) METHOD AND DEVICE FOR ALLOCATING SL HARQ FEEDBACK REPORT RESOURCE IN NR V2X

(71) Applicant: LG Electronics Inc., Seoul (KR)

(72) Inventors: Woosuk Ko, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/958,836

(22) Filed: Oct. 3, 2022

(65) Prior Publication Data

US 2023/0045750 A1    Feb. 9, 2023

Related U.S. Application Data

(63) Continuation of application No. 17/590,563, filed on Feb. 1, 2022, now Pat. No. 11,510,189, which is a
(Continued)

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1812* (2013.01); *H04W 72/0446* (2013.01);
(Continued)

(58) Field of Classification Search
CPC ......... H04W 72/0413; H04W 72/0446; H04W 72/0453; H04W 72/0466; H04W 72/1289; H04L 1/1812
See application file for complete search history.

(56) References Cited

U.S. PATENT DOCUMENTS 11,510,189 B2 *  11/2022  Ko ................. H04L 5/0082
2019/0052436 A1   2/2019  Desai et al.
(Continued)

FOREIGN PATENT DOCUMENTS

EP    3897056    10/2021
EP    3911069    11/2021

OTHER PUBLICATIONS

Extended European Search Report in European Application No. 20851609.6, dated Sep. 16, 2022, 16 pages.
(Continued)

*Primary Examiner* — Brian T O Connor
(74) *Attorney, Agent, or Firm* — Fish & Richardson P.C.

(57) ABSTRACT

A method for performing wireless communication by a first device includes: receiving, from a base station, downlink control information (DCI) for scheduling a sidelink (SL) resource, the DCI including information related to time between a physical sidelink feedback channel (PSFCH) resource and a physical uplink control channel (PUCCH) resource and information related to the PUCCH resource; transmitting, to a second device, a plurality of physical sidelink control channels (PSCCHs) and a plurality of physical sidelink shared channels (PSSCHs) based on the DCI; determining a plurality of PSFCH resources based on an index of a slot and a sub channel related to the plurality of PSSCHs and a source ID of the first device; receiving a plurality of pieces of SL HARQ feedback related to the plurality of PSSCHs; and transmitting, to the base station, one piece of SL hybrid automatic repeat request (HARQ) feedback on one PUCCH resource.

20 Claims, 27 Drawing Sheets

Related U.S. Application Data continuation of application No. PCT/KR2020/010825, filed on Aug. 14, 2020.

(60) Provisional application No. 62/887,489, filed on Aug. 15, 2019.

(51) Int. Cl.
    *H04W 72/12*     (2009.01)
    *H04L 1/1812*     (2023.01)
    *H04W 72/0446*     (2023.01)
    *H04W 72/0453*     (2023.01)
    *H04W 72/044*     (2023.01)

(52) U.S. Cl.
    CPC ... *H04W 72/0453* (2013.01); *H04W 72/0466* (2013.01); *H04W 72/1289* (2013.01)

(56) References Cited

U.S. PATENT DOCUMENTS

| | | |
|---|---|---|
| 2019/0069325 A1 | 2/2019 | Yerramalli et al. |
| 2020/0053757 A1 | 2/2020 | Bagheri et al. |
| 2020/0186290 A1 | 6/2020 | Zhang et al. |
| 2020/0396024 A1 | 12/2020 | Ganesan et al. |
| 2022/0078040 A1 | 3/2022 | Lee et al. |
| 2022/0116934 A1 | 4/2022 | Zhang et al. |
| 2022/0159624 A1* | 5/2022 | Ko .................. H04L 1/0038 |
| 2022/0166558 A1* | 5/2022 | Zhang ............... H04L 1/1816 |
| 2022/0210768 A1* | 6/2022 | Zhou ................. H04L 1/1896 |

OTHER PUBLICATIONS

Samsung, "On Uu-based resource allocation and configuration," 3GPP TSG RAN WG1 #96, R1-1902289, Athens, Greece, Feb. 25-Mar. 1, 2019, 7 pages.

Huawei & HiSilicon, "Frame and slot structure for sidelink," R1-1906594, Presented at 3GPP TSG RAN WG1 Meeting #97, Reno, USA, May 13-17, 2019, 5 pages.

ITL, "Discussion on NR V2X HARQ mechanism," R1-1813976, Presented at 3GPP TSG RAN WG1 Meeting #95, Spokane, USA, Nov. 12-16, 2018, 4 pages.

Samsung, "Considerations on Sidelink HARQ Procedure," R1-1902278, Presented at 3GPP TSG RAN WG1 #96, Athens, Greece, Feb. 25-Mar. 1, 2019, 11 pages.

ZTE & Sanechips, "Discussion on PHY procedures for sidelink," R1-1906469, Presented at 3GPP TSG RAN WG1 #97, Reno, USA, May 13-17, 2019, 6 pages.

* cited by examiner

FIG. 4
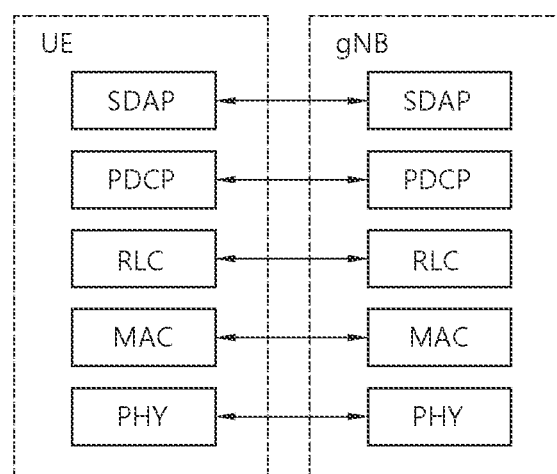
(a)
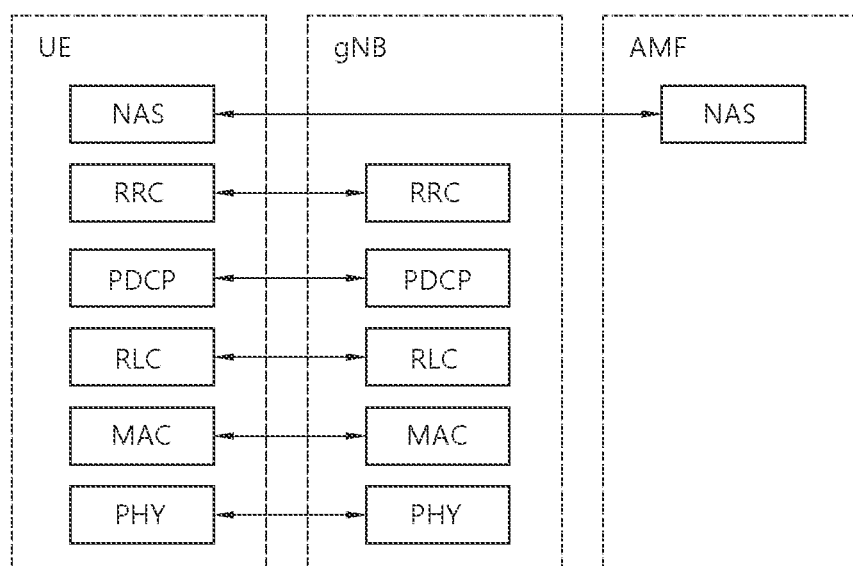
(b)

FIG. 8
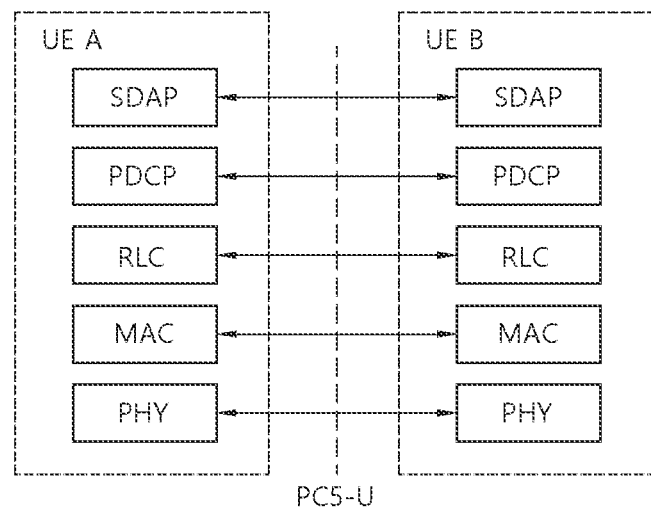
(a)
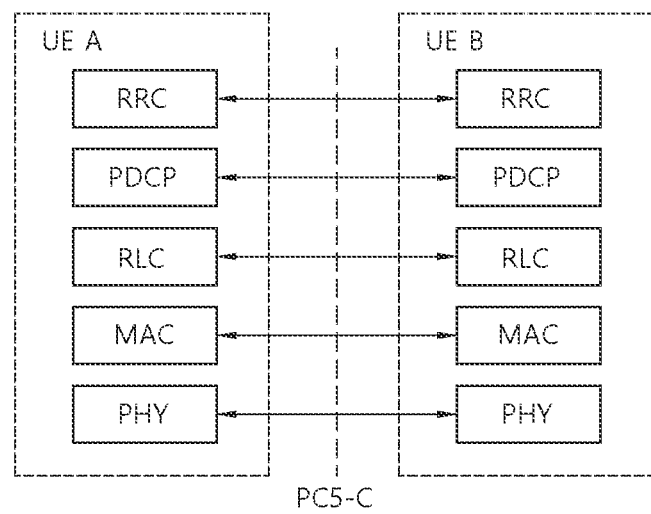
(b)

METHOD AND DEVICE FOR ALLOCATING SL HARQ FEEDBACK REPORT RESOURCE IN NR V2X

CROSS-REFERENCE TO RELATED APPLICATIONS

This application is a continuation of U.S. application Ser. No. 17/590,563, filed on Feb. 1, 2022, which is a continuation pursuant to 35 U.S.C. § 119(e) of International Application PCT/KR2020/010825, with an international filing date of Aug. 14, 2020, which claims the benefit of U.S. Provisional Patent Application No. 62/887,489, filed on Aug. 15, 2019, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in the case of LTE sidelink mode 1 or mode 3 operation, or in the case of NR sidelink mode 1 operation in which a base station allocates sidelink transmission resource(s) to UE(s), it may be necessary for a transmitting UE to report information on received HARQ feedback, in order for the base station to efficiently manage sidelink resource(s). In addition, as described above, the transmitting UE may transmit information on SL HARQ feedback corresponding to the PSSCH and/or the PSCCH transmitted to the receiving UE to the base station through the PUCCH. Therefore, there is a need to propose a method in which the base station efficiently allocates resource(s) for PUCCH transmission for SL HARQ feedback report to the transmitting UE.

Technical Solutions

In one embodiment, a method for performing wireless communication by a first device is provided. The method may comprise: receiving, from a base station through a physical downlink control channel (PDCCH), a downlink control information (DCI) for scheduling sidelink (SL) resources, wherein the DCI includes information related to a time between a physical sidelink feedback channel (PSFCH) resource and a physical uplink control channel (PUCCH) resource and information related to the PUCCH resource; transmitting, to a second device, a plurality of physical sidelink control channels (PSCCHs) and a plurality of physical sidelink shared channels (PSSCHs), based on the DCI; determining a plurality of PSFCH resources, based on indices of slots related to the plurality of PSSCHs, indices of subchannels related to the plurality of PSSCHs, and a source ID of the first device; receiving, from the second device, a plurality of SL hybrid automatic repeat request (HARQ) feedbacks related to the plurality of PSSCHs on the plurality of PSFCH resources; and transmitting, to the base station, one SL HARQ feedback on one PUCCH resource, based on the information related to the time and the information related to the PUCCH resource, wherein the one PUCCH resource is allocated after a last PSFCH resource among the plurality of PSFCH resources.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: receive, from a base station through a physical downlink control channel (PDCCH), a downlink control information (DCI) for scheduling sidelink (SL) resources, wherein the DCI includes information related to a time between a physical sidelink feedback channel (PSFCH) resource and a physical uplink control channel (PUCCH) resource and information related to the PUCCH resource; transmit, to a second device, a plurality of physical sidelink control channels (PSCCHs) and a plurality of physical sidelink shared channels (PSSCHs), based on the DCI; determine a plurality of PSFCH resources, based on indices of slots related to the plurality of PSSCHs, indices of subchannels related to the plurality of PSSCHs, and a source ID of the first device; receive, from the second device, a plurality of SL hybrid automatic repeat request (HARQ) feedbacks related to the plurality of PSSCHs on the plurality of PSFCH resources; and transmit, to the base station, one SL HARQ feedback on one PUCCH resource, based on the information related to the time and the information related to the PUCCH resource, wherein the one PUCCH resource is allocated after a last PSFCH resource among the plurality of PSFCH resources.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
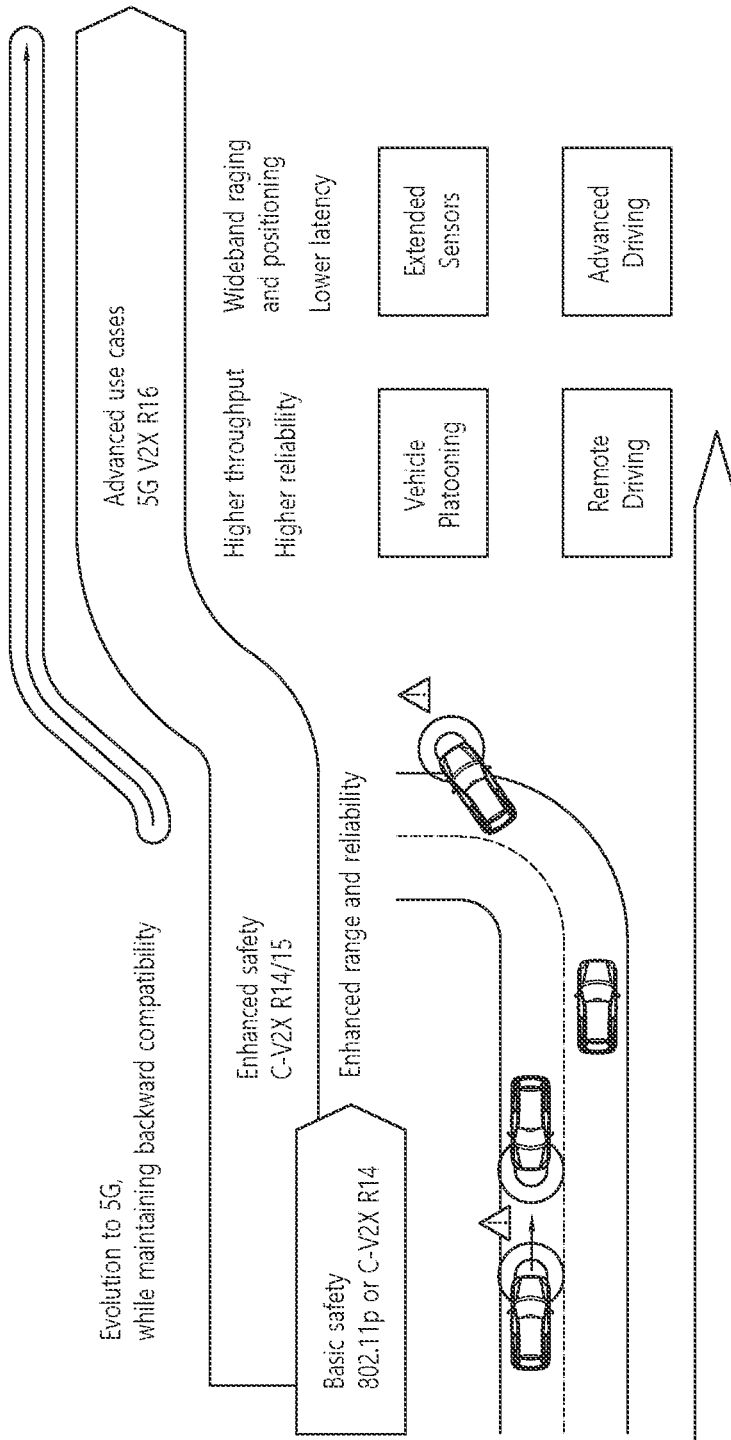
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B. or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B. and C" may mean "only A", "only B", "only C", or "any combination of A, B, and C". In addition, "at least one of A, B, or C" or "at least one of A, B, and/or C" may mean "at least one of A. B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
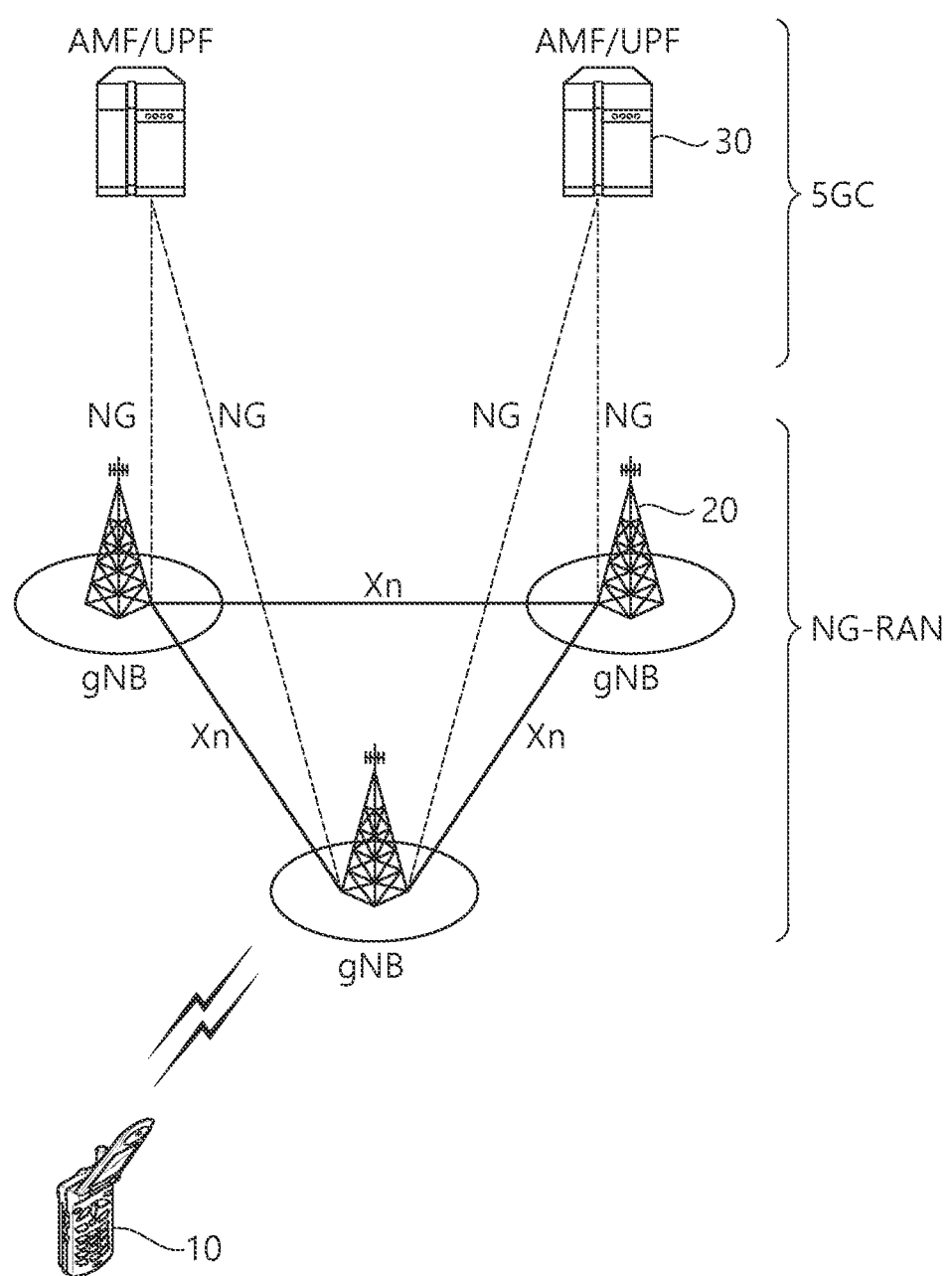
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
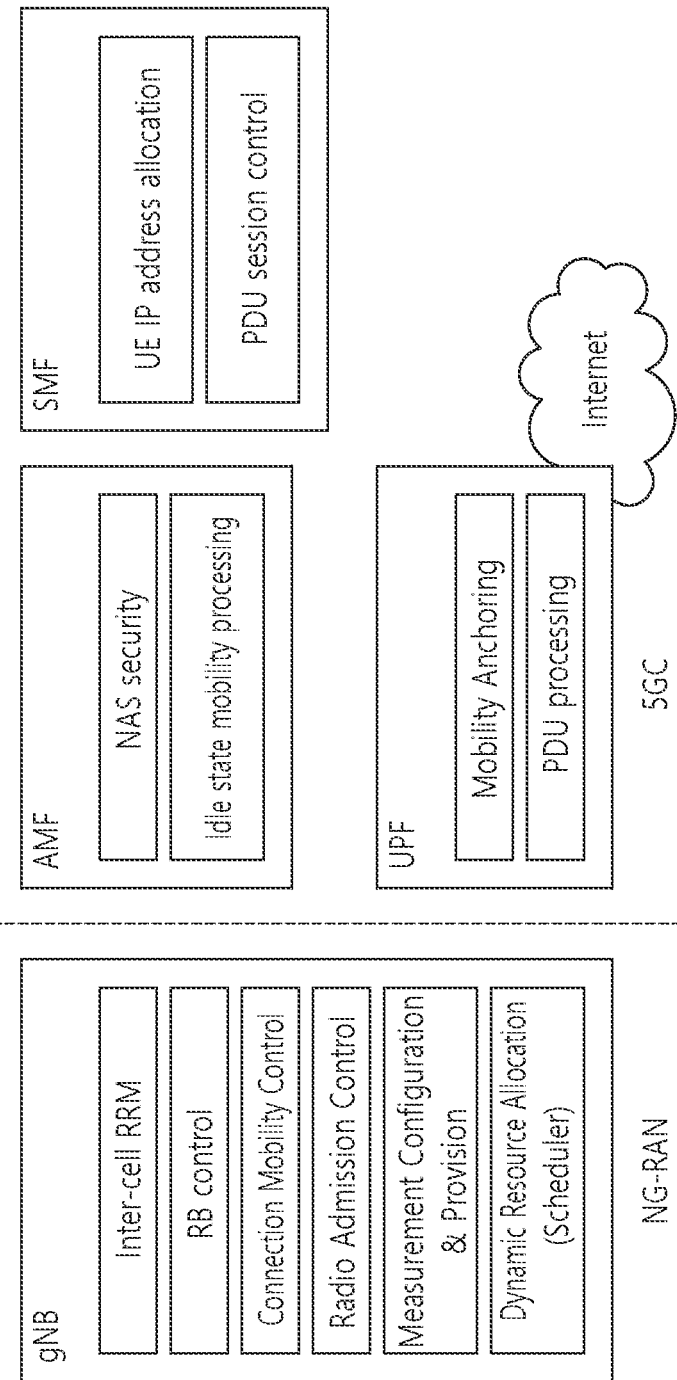
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
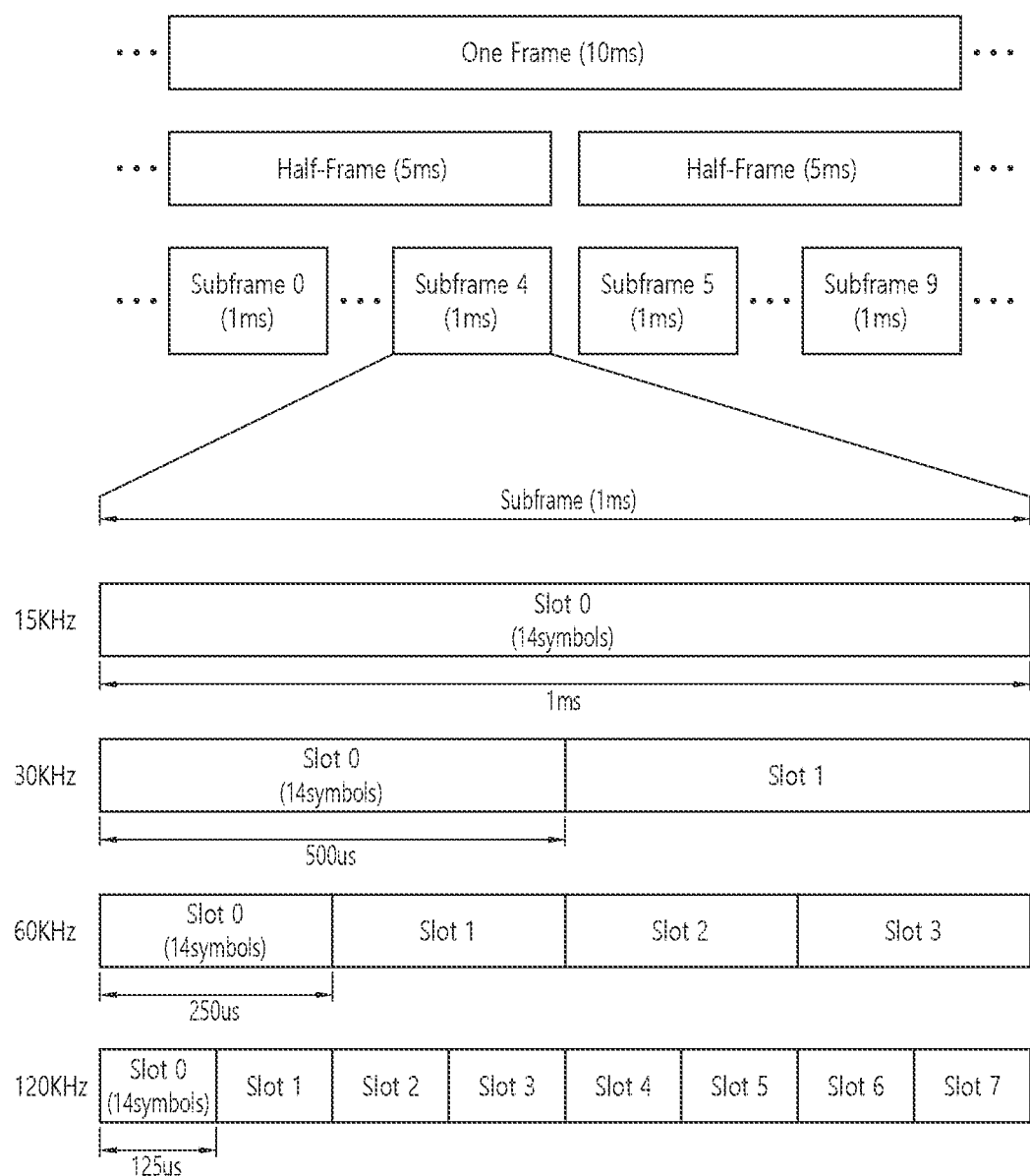
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
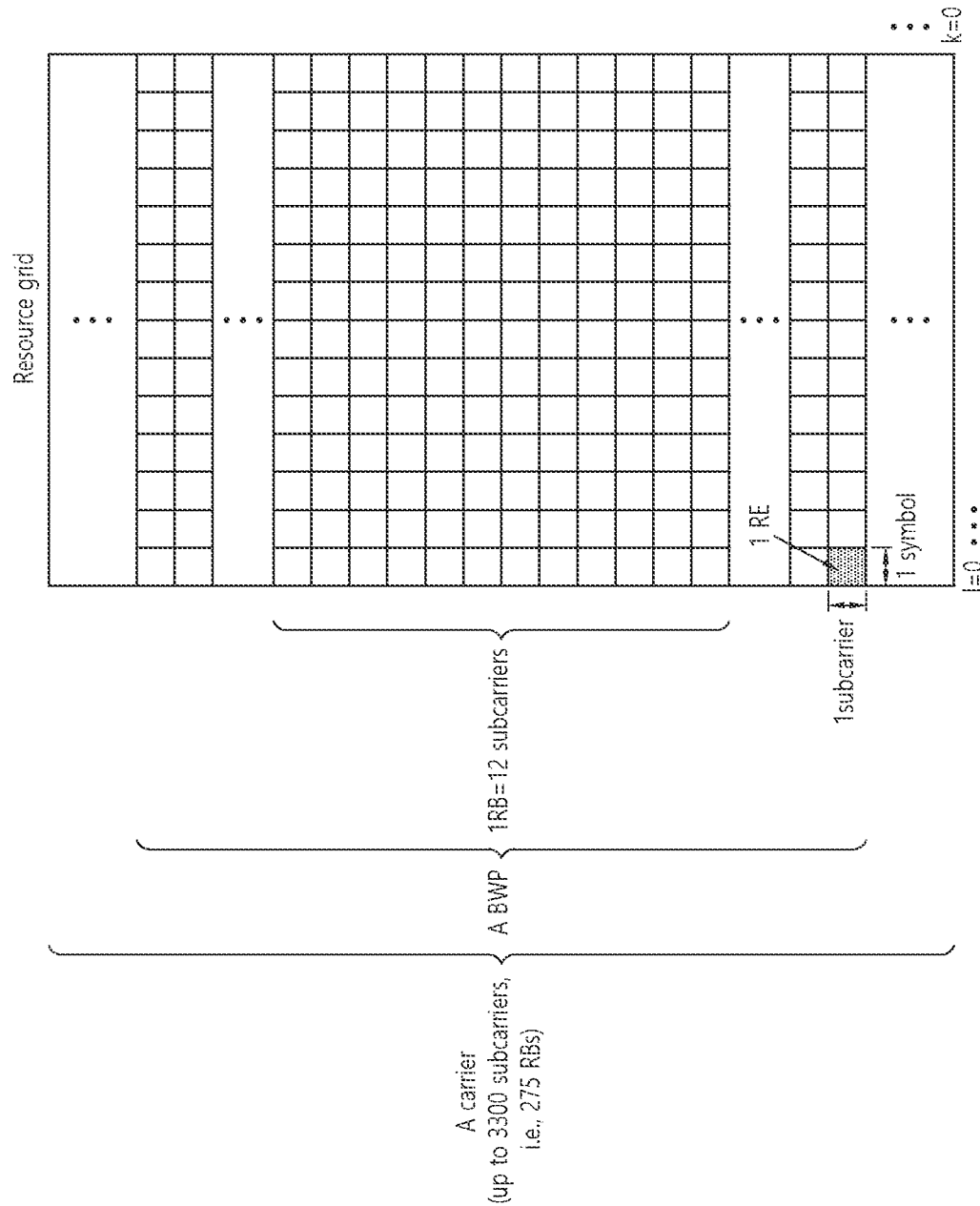
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP. [%] Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
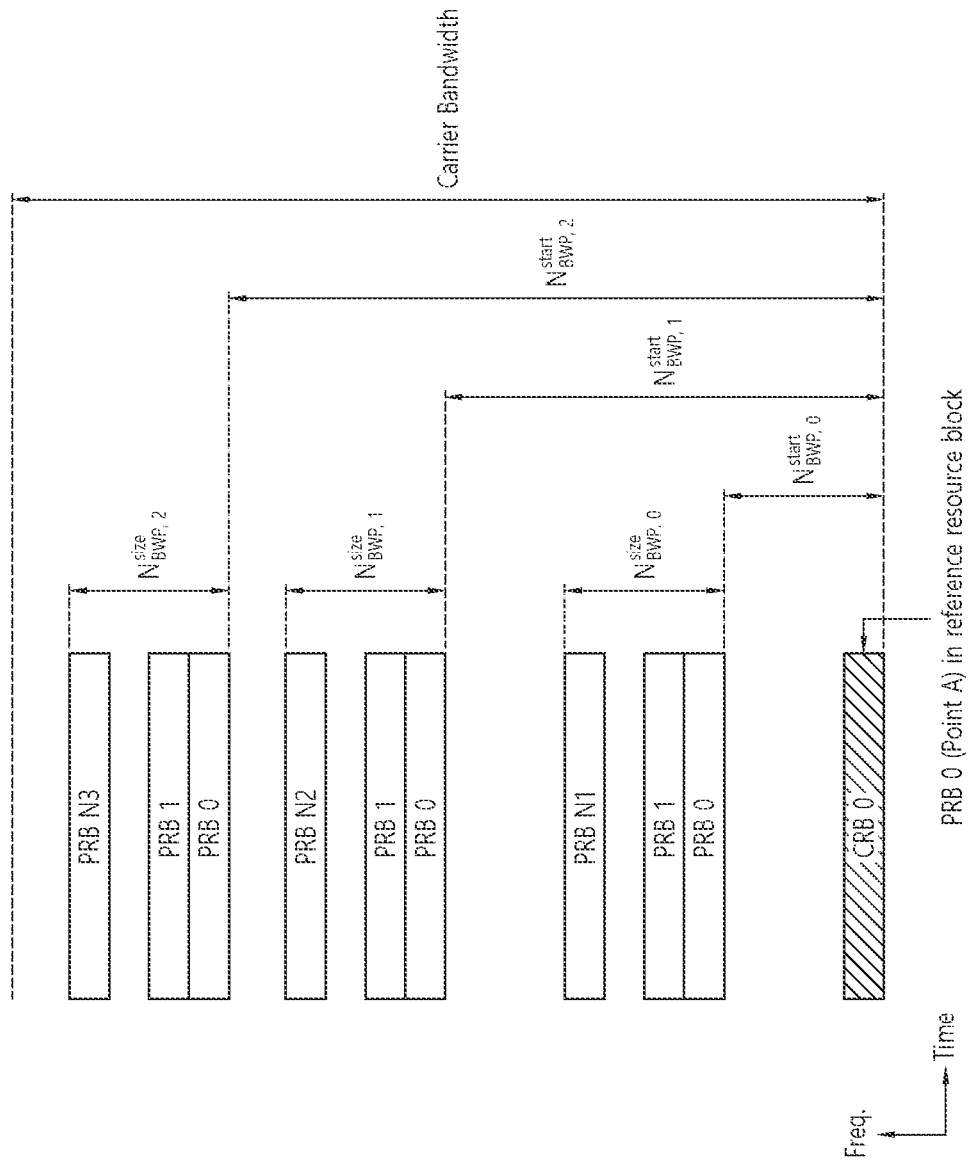
FIG. 7 shows an example of a BWP based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A. and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
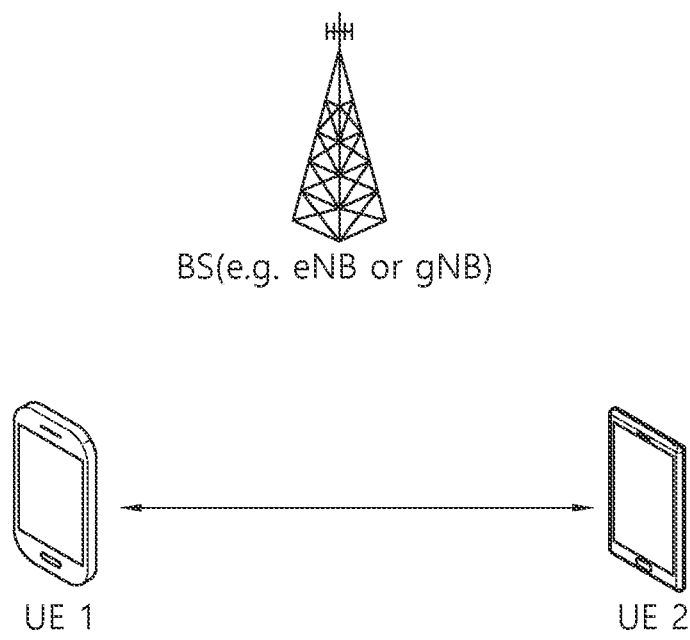
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
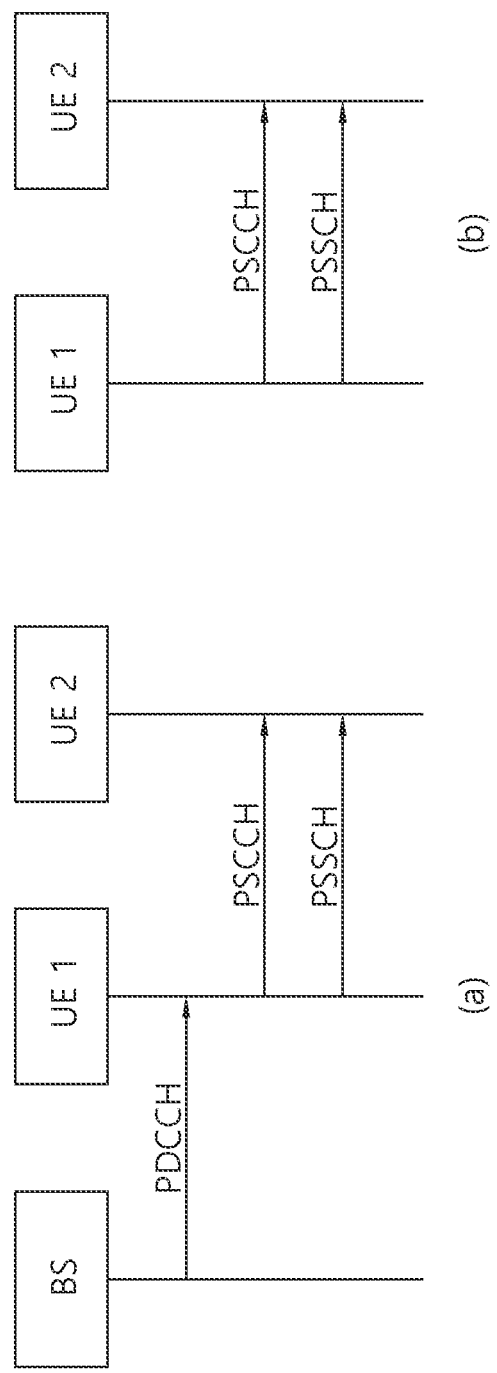
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example. FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
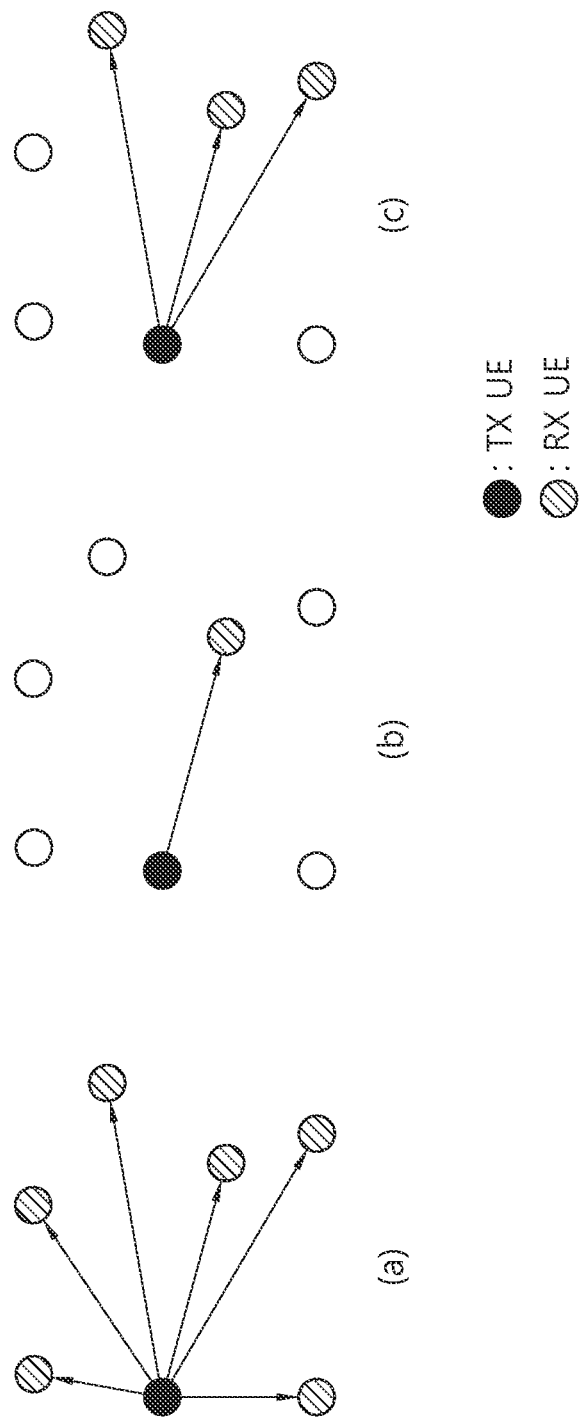
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically. FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in NR sidelink, at least from the viewpoint of transmission of a UE in carrier(s), time division multiplexing (TDM) between a PSCCH/PSSCH and a physical sidelink feedback channel (PSFCH) is allowed for transmission of PSFCH format for sidelink in slots. In addition, in unicast sidelink communication, hybrid automatic repeat request (HARQ) feedback transmission of UE(s) may be supported. In addition, in groupcast sidelink communication, HARQ feedback transmission of UE(s) may be supported. That is, in the unicast sidelink communication or the groupcast sidelink communication, a receiving UE may transmit HARQ feedback corresponding to a PSCCH and/or a PSSCH received from a transmitting UE to the transmitting UE. Furthermore, when HARQ feedback is enabled for the groupcast sidelink communication, the HARQ feedback option 1 or the HARQ feedback option 2 may be supported.

According to the HARQ feedback option 1, a receiving UE may transmit only HARQ negative acknowledgement (NACK) to a transmitting UE. That is, the receiving UE may not transmit HARQ acknowledgement (ACK) to the transmitting UE. If the HARQ feedback option 1 is used for sidelink groupcast transmission, a plurality of receiving UEs (e.g., all receiving UEs or some receiving UEs in a group) may share a PSFCH resource to transmit HARQ feedback.

On the other hand, according to the HARQ feedback option 2, a receiving UE may transmit HARQ ACK or HARQ NACK to a transmitting UE. If the HARQ feedback option 2 is used for sidelink groupcast transmission, a plurality of receiving UEs (e.g., each receiving UEs in a group) transmits HARQ ACK or HARQ NACK by using separate PSFCH resources. For example, each of PSFCH resources may be mapped to a time resource, a frequency resource, and a code resource.

In slots associated with a resource pool, PSFCH resources may be periodically (pre-)configured with a period of N slots. For example, N may be a positive integer. For example, N may be 2 or 4.

Meanwhile, in NR sidelink, a sequence-based PSFCH format having one symbol may be supported. The one symbol does not include an automatic gain control (AGC) training period. The sequence-based PSFCH format having the one symbol may be applicable to HARQ feedback in unicast. In addition, the sequence-based PSFCH format having one symbol may be applicable to HARQ feedback in groupcast including the HARQ feedback option 1 and the HARQ feedback option 2. The sequence-based PSFCH format sequence having one symbol may be generated similarly to the sequence of a PUCCH format 0.

In the case of the HARQ feedback option 1 based on TX-RX distance-based HARQ feedback for groupcast, if the TX-RX distance is less than or equal to the communication range requirement, a receiving UE may transmit HARQ feedback for a PSSCH. Otherwise, the receiving UE may not transmit HARQ feedback for the PSSCH. For example, the location of the transmitting UE may be indicated by a SCI related to the PSSCH.

Meanwhile, for PSSCH transmission in the last symbol of slot n. HARQ feedback related to the PSSCH transmission is expected to be in slot n+a. Herein, a may be the smallest integer greater than or equal to K under the condition that slot n+a includes PSFCH resource(s). In addition, if at least a PSFCH in the slot is a response to a single PSSCH, the implicit mechanism may be used to determine at least a frequency domain resource and/or a code domain resource of the PSFCH within the configured resource pool.

Meanwhile, in case a base station allocates resource(s) for sidelink transmission to a transmitting UE, if the transmitting UE that has performed sidelink transmission through the resource(s) receives HARQ feedback for the sidelink transmission from a receiving UE, the transmitting UE needs to report information on the HARQ feedback to the base station.

For example, it is assumed that a base station allocates a first PSSCH and/or a first PSCCH for initial transmission to a transmitting UE and allocates a second PSSCH and/or a second PSCCH for sidelink HARQ feedback-based retransmission to the transmitting UE. In this case, the transmitting UE may transmit sidelink information to a receiving UE through the first PSSCH and/or the first PSCCH. In the present disclosure, the sidelink information may include at least one of sidelink data, sidelink control information, a sidelink service, or a sidelink packet. Thereafter, if the transmitting UE receives HARQ NACK from the receiving UE, the transmitting UE may report information on HARQ feedback related to the HARQ NACK to the base station through a PUCCH, and the transmitting UE may retransmit the sidelink information to the receiving UE through the second PSSCH and/or the second PSCCH. Thereafter, if the transmitting UE receives HARQ NACK from the receiving UE, the transmitting UE may report information on HARQ feedback related to the HARQ NACK to the base station through a PUCCH. In this case, the base station may allocate additional sidelink transmission resource(s) to the transmitting UE.

For example, it is assumed that a base station allocates a first PSSCH and/or a first PSCCH for initial transmission to a transmitting UE and allocates a second PSSCH and/or a second PSCCH for sidelink HARQ feedback-based retransmission to the transmitting UE. In this case, the transmitting UE may transmit sidelink information to a receiving UE through the first PSSCH and/or the first PSCCH. Thereafter, if the transmitting UE receives HARQ ACK from the receiving UE, the transmitting UE may report information on HARQ feedback related to the HARQ ACK to the base station through a PUCCH. In this case, it may be unnecessary for the transmitting UE to perform sidelink HARQ feedback-based retransmission through the second PSSCH and/or the second PSCCH. Accordingly, for example, the base station may allocate resource(s) related to the second PSSCH and/or the second PSCCH to another UE or may allocate it for uplink transmission of the transmitting UE.

As described above, in the case of LTE sidelink mode 1 or mode 3 operation, or in the case of NR sidelink mode 1 operation in which a base station allocates sidelink transmission resource(s) to UE(s), it may be necessary for a transmitting UE to report information on received HARQ feedback, in order for the base station to efficiently manage sidelink resource(s). In addition, as described above, the transmitting UE may transmit information on SL HARQ feedback corresponding to the PSSCH and/or the PSCCH transmitted to the receiving UE to the base station through the PUCCH. Therefore, there is a need to propose a method in which the base station efficiently allocates resource(s) for PUCCH transmission for SL HARQ feedback report to the transmitting UE. Hereinafter, based on an embodiment of the present disclosure, a method for allocating resource(s) for SL HARQ feedback report and an apparatus supporting the same will be described in detail.

Figure 12:
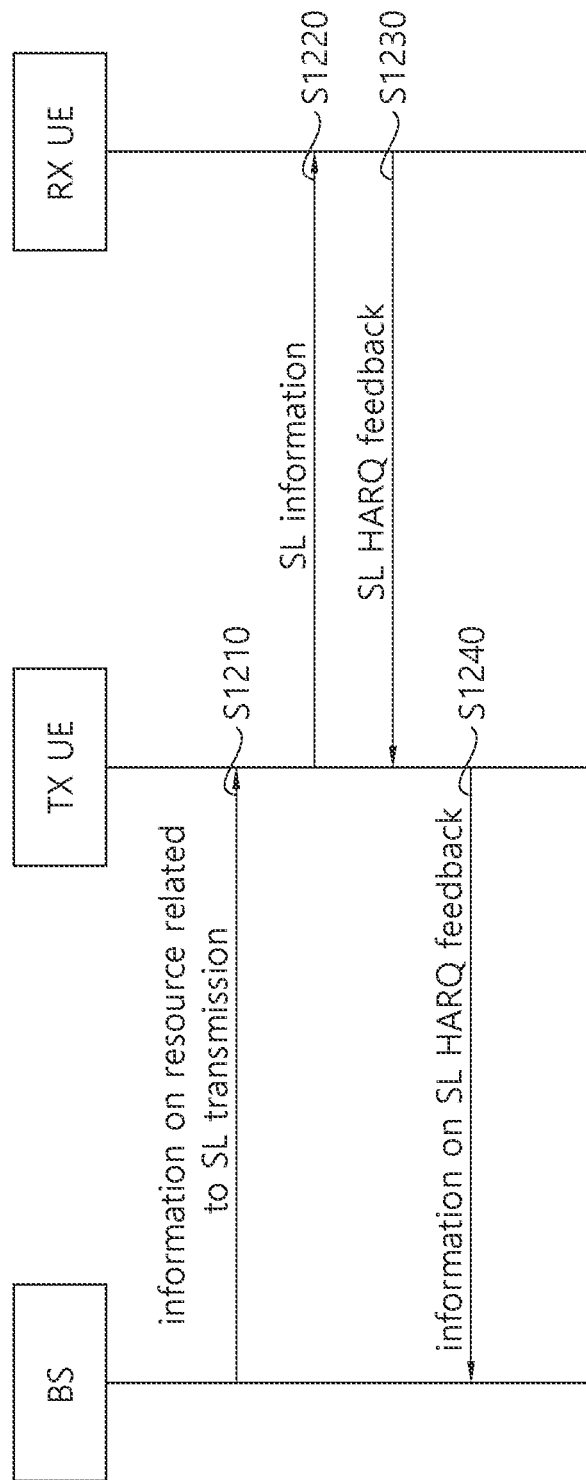
FIG. 12 shows a procedure for a transmitting UE to report information on SL HARQ feedback to a base station, based on an embodiment of the present disclosure.

FIG. 12 shows a procedure for a transmitting UE to report information on SL HARQ feedback to a base station, based on an embodiment of the present disclosure. The embodiment of FIG. 12 may be combined with various embodiments of the present disclosure.

Referring to FIG. 12, in step S1210, a base station may transmit information on resource(s) related to sidelink transmission to a transmitting UE. For example, the base station may allocate resource(s) related to sidelink transmission to the transmitting UE. For example, the resource(s) related to sidelink transmission may be at least one of resource(s) for the transmitting UE to transmit sidelink information to a receiving UE and/or resource(s) for the transmitting UE to report information on SL HARQ feedback to the base station. For example, the resource(s) related to sidelink transmission may be at least one of resource(s) for the transmitting UE to receive SL HARQ feedback corresponding to the sidelink information from the receiving UE and/or resource(s) for the receiving UE to transmit SL HARQ feedback corresponding to the sidelink information to the transmitting UE. In the present disclosure, for convenience of description, a resource for the transmitting UE to transmit sidelink information may be referred to as a sidelink transmission resource, and a resource for the transmitting UE to report information on SL HARQ feedback to the base station may be referred to as a SL HARQ feedback report resource. For example, the sidelink transmission resource may be resource(s) related to transmission of one or more PSSCHs and/or one or more PSCCHs. For example, the SL HARQ feedback report resource may be resource(s) related to PUCCH transmission. For example, the SL HARQ feedback report resource may be resource(s) related to PUSCH transmission. In the present disclosure, for convenience of description, a resource related to PSSCH transmission may be referred to as a PSSCH resource, and a resource related to PSCCH transmission may be referred to as a PSCCH resource, and a resource related to PUCCH transmission may be referred to as a PUCCH resource, and a resource related to transmission and reception of SL HARQ feedback may be referred to as a PSFCH resource, and a resource related to PUSCH transmission may be referred to as a PUSCH resource.

Based on an embodiment of the present disclosure, the base station may signal resource(s) related to sidelink transmission to the transmitting UE through a SL DCI, and/or the base station may configure resource(s) related to sidelink transmission to the transmitting UE through RRC signaling or a MAC CE. In the present disclosure, the SL DCI may be a DCI for scheduling sidelink transmission-related resources.

For example, the SL DCI may be a sidelink dynamic scheduling DCI. In this case, for example, if the transmitting UE intends to transmit a new packet, the transmitting UE may report SL scheduling request (SR) and/or SL buffer status report (BSR) information to the base station, and the base station may allocate an initial resource and/or retransmission resource(s) required for packet transmission based on the SL SR/BSR information. For example, if there is data to be transmitted through sidelink, SL SR may be signaling transmitted by the transmitting UE to induce sidelink resource allocation by notifying the base station that data to be transmitted through sidelink exists. For example, the SL BSR may be signaling in which the transmitting UE informs the base station of the amount of sidelink data existed in a buffer to be transmitted through the MAC layer in a higher layer.

For example, the SL DCI may be a SL semi-persistent scheduling (SPS) DCI. The SL SPS DCI may be a DCI for activating SL SPS resource(s) or a DCI for releasing SL SPS resource(s). For example, the SL SPS resource(s) may be resource(s) related to a configured grant. In this case, for example, the base station may periodically allocate an initial resource and/or retransmission resource(s) necessary for transmitting a plurality of packets, based on UE assistance information reported or previously reported by the UE. For example, the UE assistance information may include a period of traffic generated by the UE and/or the size of traffic generated by the UE.

Hereinafter, a method for a base station to allocate resource(s) related to sidelink transmission through a SL DCI, a MAC CE and/or RRC signaling will be described in detail with reference to the embodiment of FIG. 13.

Figure 13:
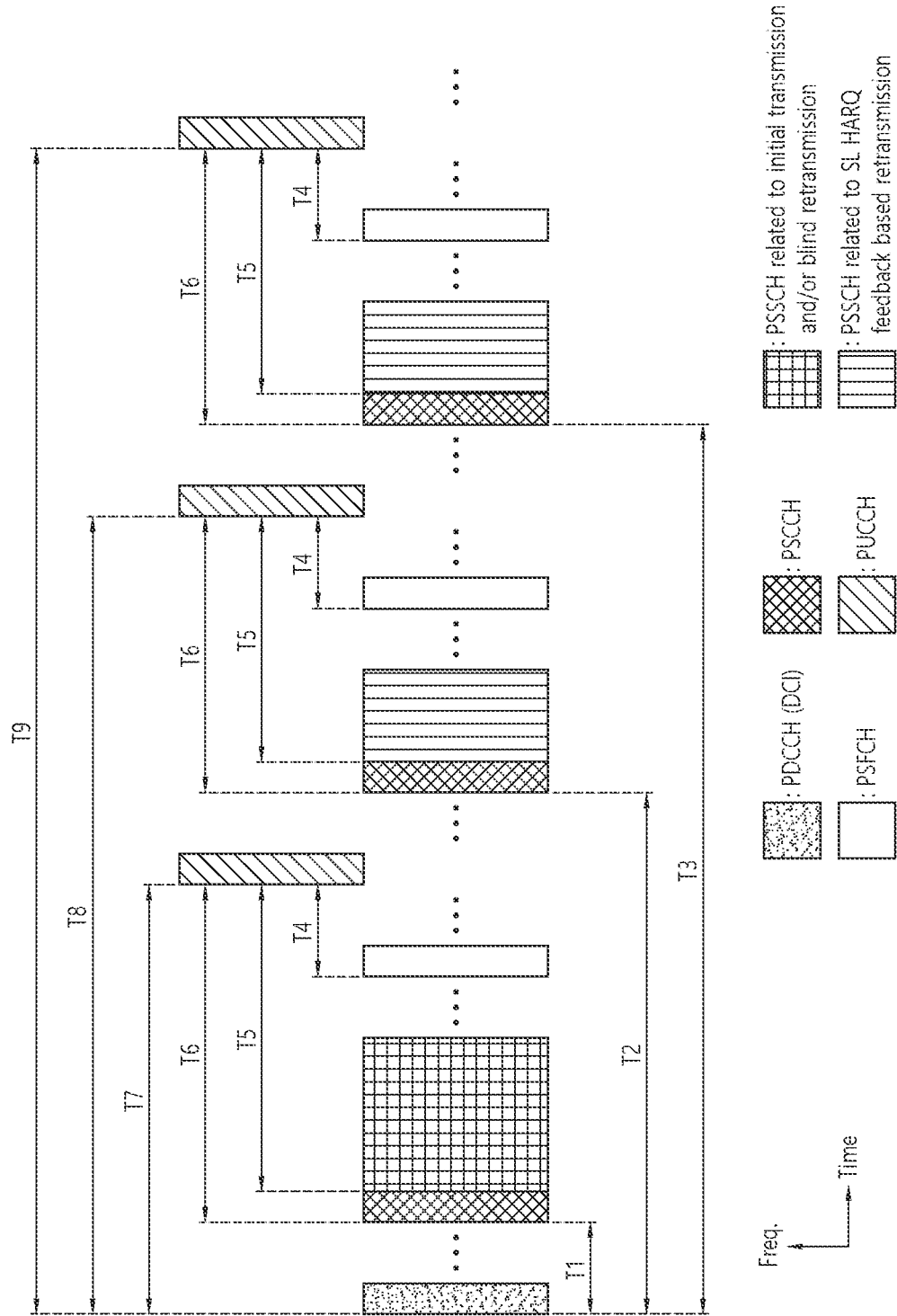
FIG. 13 shows an example of resource allocation based on an embodiment of the present disclosure.

FIG. 13 shows an example of resource allocation based on an embodiment of the present disclosure. The embodiment of FIG. 13 may be combined with various embodiments of the present disclosure.

In the embodiment of FIG. 13, it is assumed that one initial transmission resource, one or more blind retransmission resources, and two SL HARQ feedback-based retransmission resources are allocated to the UE. However, the technical idea of the present disclosure is not limited thereto, and the number of blind retransmission resources or the number of SL HARQ feedback-based retransmission resources may be variously allocated to the UE. In addition, in the embodiment of FIG. 13, it is assumed that one PSFCH is related to one PSCCH and/or one PSSCH. However, the technical idea of the present disclosure is not limited thereto, and one PSFCH may be related to one or more PSCCHs and/or one or more PSSCHs. Furthermore, in the embodiment of FIG. 13, if the SL DCI is the SL SPS DCI, resources for sidelink communication may be repeatedly (periodically) allocated to the UE.

1) Allocation of PSCCH Resource(s) and/or PSSCH Resource(s)

Referring to FIG. 12, in step S1210, the base station may transmit information on one or more PSCCH resources and/or one or more PSSCH resources to the transmitting UE. For example, the base station may transmit information on a time offset (or a time gap) related to one or more PSCCH resources and/or one or more PSSCH resources to the transmitting UE through a SL DCI, a MAC CE and/or RRC signaling. In this case, for example, one or more PSCCH resources and/or one or more PSSCH resources may be allocated to the transmitting UE after the time offset from a time when the base station transmits the SL DCI. For example, one or more PSCCH resources and/or one or more PSSCH resources may be resource(s) for the transmitting UE to perform initial transmission. For example, one or more PSCCH resources and/or one or more PSSCH resources may be resource(s) for the transmitting UE to perform initial transmission and/or blind retransmission. For example, one or more PSCCH resources and/or one or more PSSCH resources may be resource(s) for the transmitting UE to perform initial transmission and/or SL HARQ feedback-based retransmission. For example, one or more PSCCH resources and/or one or more PSSCH resources may be resource(s) for the transmitting UE to perform initial transmission, blind retransmission, and/or SL HARQ feedback-based retransmission. In the present disclosure, the blind retransmission means that the transmitting UE performs retransmission regardless of HARQ feedback from the receiving UE, and the SL HARQ feedback-based retransmission means that the transmitting UE performs retransmission based on HARQ feedback (e.g., HARQ NACK) from the receiving UE.

Referring to the embodiment of FIG. 13, the base station may transmit information on time offsets T1, T2 and T3 to the transmitting UE through a SL DCI, a MAC CE, and/or RRC signaling. Accordingly, after T1 from a time when the base station transmits the SL DCI, one or more PSCCH resources and/or one or more PSSCH resources for initial transmission and/or blind retransmission may be allocated to the transmitting UE. In addition, after T2 from the time when the base station transmits the SL DCI, one or more PSCCH resources and/or one or more PSSCH resources for SL HARQ feedback-based retransmission may be allocated to the transmitting UE. In addition, after T3 from the time when the base station transmits the SL DCI, one or more PSCCH resources and/or one or more PSSCH resources for SL HARQ feedback-based retransmission may be allocated to the transmitting UE.

2) Allocation of PSFCH Resource(s)

Referring to FIG. 12, in step S1210, the base station may transmit information on a time offset (or time gap) related to a PSFCH resource through a SL DCI, a MAC CE and/or RRC signaling to the transmitting UE and/or the receiving UE. In this case, for example, the PSFCH resource may be allocated to the transmitting UE and/or the receiving UE after the time offset from a time when the receiving UE receives a PSCCH and/or a PSSCH.

Alternatively, based on an embodiment of the present disclosure, the transmitting UE and/or the receiving UE may determine a PSFCH resource based on an implicit rule. For example, the receiving UE may determine the PSFCH resource used to transmit HARQ feedback to the transmitting UE, based on PSCCH and/or PSSCH-related (transmission) parameters (e.g., PSCCH and/or PSSCH-related slot index, PSCCH and/or PSSCH-related sub-channel index, source identity (ID), destination ID, local group ID, etc.).

For example, in case the base station allocates resource(s) related to sidelink transmission to the transmitting UE, the transmitting UE may receive PSCCH and/or PSSCH-related (transmission) parameters (e.g., PSCCH and/or PSSCH-related slot index and PSCCH and/or PSSCH-related sub-channel index) from the base station. For example, in case the transmitting UE autonomously determines or selects resource(s) related to sidelink transmission, the transmitting UE may autonomously determine PSCCH and/or PSSCH-related (transmission) parameters (e.g., PSCCH and/or PSSCH-related slot index and PSCCH and/or PSSCH-related sub-channel index).

For example, the source ID may be an identifier for identifying a transmitting side (e.g., the transmitting UE) of sidelink information in sidelink communication. For example, the destination ID may be an identifier for identifying a receiving side (e.g., the receiving UE) of sidelink information in sidelink communication. For example, the local group 1D may be an identifier for identifying a group including UEs in groupcast sidelink communication. For example, the source ID, the destination ID, and/or the local group ID may be transmitted through a layer-2 (e.g., MAC layer). For example, the source ID, the destination ID, and/or the local group ID may be provided from a higher layer (e.g., an application layer) or derived from an ID provided by a higher layer.

3) Allocation of PUCCH Resource(s)

Referring to FIG. 12, in step S1210, the base station may transmit information on a PUCCH resource to the transmitting UE. For example, the base station may transmit information on a time offset (or time gap) related to the PUCCH resource to the transmitting UE through a SL DCI, a MAC CE and/or RRC signaling. In this case, for example, a resource (i.e., PUCCH resource) for the transmitting UE to report information on SL HARQ feedback to the base station may be allocated to the transmitting UE after the time offset from a time when the transmitting UE receives the PSFCH. For example, the PUCCH resource may be allocated to the transmitting UE after the time offset from a time when the base station allocates one or more PSCCH resources to the transmitting UE. For example, the PUCCH resource may be allocated to the transmitting UE after the time offset from a time when the base station allocates one or more PSSCH resources to the transmitting UE. For example, the PUCCH resource may be allocated to the transmitting UE after the time offset from a time when the base station transmits the SL DCI. In the present disclosure, the PUCCH resource may be replaced with a PUSCH resource.

Referring to the embodiment of FIG. 13, the base station may transmit information on the time offset (T4, T5, T6, T7, T8 and/or T9) to the transmitting UE through the SL DCI, the MAC CE and/or the RRC signaling. Accordingly, the PUCCH resource may be allocated to the transmitting UE after T4 from a time when the transmitting UE receives the PSFCH. Alternatively, for example, the PUCCH resource may be allocated to the transmitting UE after T6 from a time when the base station allocates one or more PSCCH resources to the transmitting UE. Alternatively, for example, the PUCCH resource may be allocated to the transmitting UE after T5 from a time when the base station allocates one or more PSSCH resources to the transmitting UE. Alternatively, for example, the PUCCH resource may be allocated to the transmitting UE after T7, T8, and T9 from a time when the base station transmits the SL DCI. Based on the embodiment of FIG. 13, the time offset is applied from the start symbol of the resource(s). However, the technical idea of the present disclosure is not limited thereto. That is, the time offset and a reference timing point of the time offset may be defined in various ways. For example, the time offset may be applied from the last symbol of the resource(s). For example, the time offset may be applied from a slot in which the resource(s) is located.

Hereinafter, based on an embodiment of the present disclosure, a PUCCH resource allocation method based on the time offset and the reference timing point of the time offset will be described in detail.

3.1) PUCCH Resource Allocation Based on Symbol Unit Offset

Based on an embodiment of the present disclosure, the information on the PUCCH resource may include information on a time offset (or symbol offset) from the reference timing point to a symbol related to the PUCCH resource and information on a PUCCH resource index (based on a frequency domain and/or a code domain) on the symbol or the symbol duration related to the PUCCH resource. For example, the reference timing point may be at least one of the start symbol of the resource through which the SL DCI is transmitted, the last symbol of the resource through which the SL DCI is transmitted, the start symbol of the PSSCH resource, the last symbol of the PSSCH resource, the start symbol of the PSCCH resource, the last symbol of the PSCCH resource, the start symbol of the PSFCH resource, and/or the last symbol of the PSFCH resource. For example, the symbol related to the PUCCH resource may be at least one of the start symbol of the PUCCH resource and/or the last symbol of the PUCCH resource. For example, the base station may signal the information on the time offset and the information on the PUCCH resource index to the transmitting UE through the SL DCI. Alternatively, for example, the base station may configure the information on the time offset to the transmitting UE through the MAC CE and/or the RRC signaling, and the base station may signal the information on the PUCCH resource index to the transmitting UE through the SL DCI. In this case, payloads of the SL DCI may be reduced. If the transmitting UE receives the information on the time offset, the transmitting UE may know/determine the symbol or the symbol duration related to the PUCCH resource. In addition, if the transmitting UE receives the information on the PUCCH resource index indicating/representing the frequency domain and/or the code domain of the PUCCH resource, the transmitting UE may know/determine the frequency domain and/or the code domain related to the PUCCH resource in the symbol or the symbol duration related to the PUCCH resource. In this case, the PUCCH resource index indicating/representing the frequency domain of the PUCCH resource may be, for example, a resource block index, and the PUCCH resource index indicating/representing the code domain of the PUCCH resource may be, for example, an orthogonal code index or an orthogonal cover code index.

Alternatively, the base station may allocate a specific frequency domain as the PUCCH resource. In this case, if the transmitting UE receives the information on the time offset, the transmitting UE may know/determine the symbol or the symbol duration related to the PUCCH resource. In addition, the transmitting UE may know/determine that the specific frequency domain on the symbol or the symbol duration related to the PUCCH resource is allocated as the PUCCH resource. For example, the specific frequency domain related to the PUCCH resource may be predefined for the UE. For example, the UE may determine the specific frequency domain related to the PUCCH resource by using a pre-defined (implicit) rule.

Figure 14:
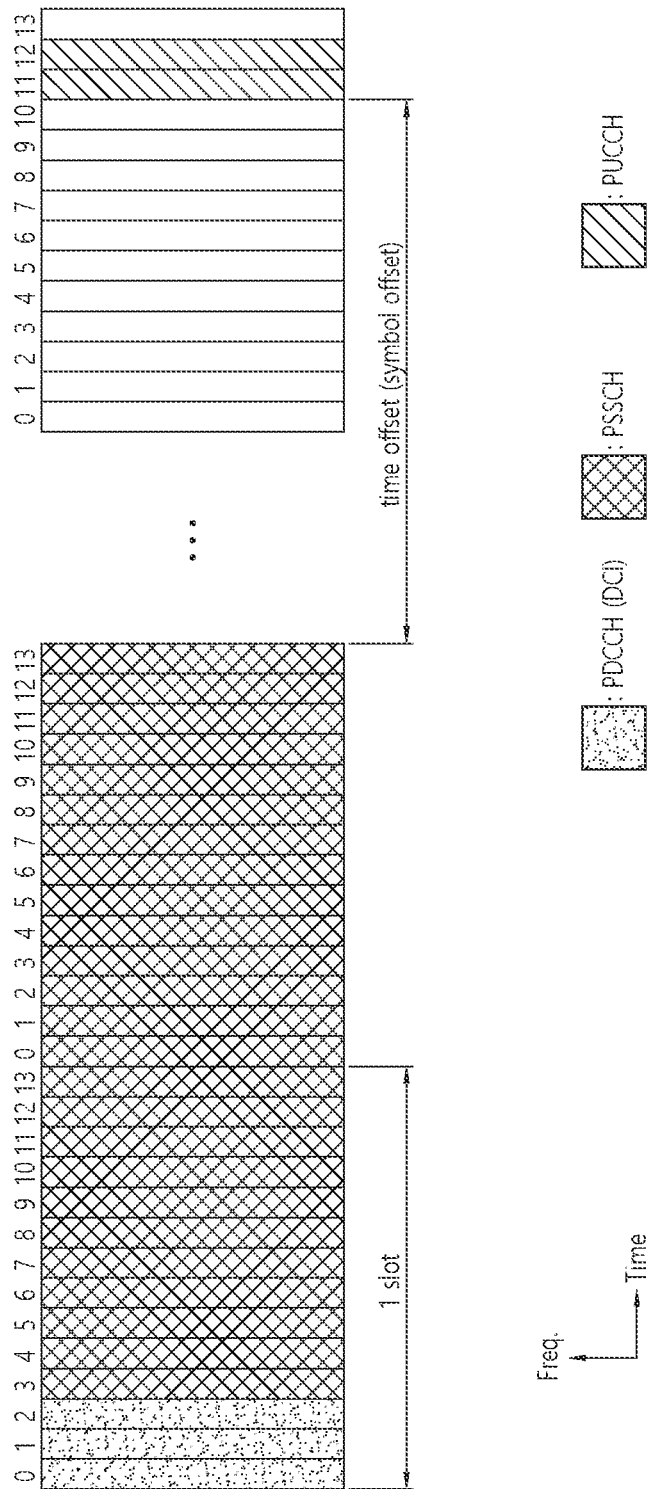
FIG. 14 shows an example of PUCCH resource allocation based on a symbol unit offset, based on an embodiment of the present disclosure.

FIG. 14 shows an example of PUCCH resource allocation based on a symbol unit offset, based on an embodiment of the present disclosure. The embodiment of FIG. 14 may be combined with various embodiments of the present disclosure.

Referring to FIG. 14, it is assumed that the reference timing point is the last symbol of the PSSCH resource, and it is assumed that a symbol related to the PUCCH resource is the start symbol of the PUCCH resource. In this case, the transmitting UE may receive the time offset from the base station, and may know/determine the symbol or the symbol duration related to the PUCCH resource of the transmitting UE. Additionally, the transmitting UE may receive information on the PUCCH resource index indicating/representing the frequency domain and/or the code domain of the PUCCH resource, and the transmitting UE may know/determine the frequency domain and/or code domain related to the PUCCH resource in the symbol or the symbol duration related to the PUCCH resource. In this case, the PUCCH resource index indicating/representing the frequency domain of the PUCCH resource may be, for example, a resource block index, and the PUCCH resource index indicating/representing the code domain of the PUCCH resource may be, for example, an orthogonal code index or an orthogonal cover code index.

3.2) PUCCH Resource Allocation Based on Slot Unit Offset

Based on an embodiment of the present disclosure, the information on the PUCCH resource may include information on a time offset (or slot offset) from the reference timing point to a slot related to the PUCCH resource and information on a PUCCH resource index (based on a frequency domain, a symbol domain, and/or a code domain) on the slot related to the PUCCH resource. For example, the reference timing point may be at least one of the slot including the start symbol of the resource in which the SL DCI is transmitted, the slot including the last symbol of the resource in which the SL DCI is transmitted, the slot including the start symbol of the PSSCH resource, the slot including the last symbol of the PSSCH resource, the slot including the start symbol of the PSCCH resource, the slot including the last symbol of the PSCCH resource, the slot including the start symbol of the PSFCH resource, and/or the slot including the last symbol of the PSFCH resource. For example, the slot related to the PUCCH resource may be at least one of the slot including the start symbol of the PUCCH resource and/or the slot including the last symbol of the PUCCH resource. For example, the base station may signal the information on the time offset and the information on the PUCCH resource index to the transmitting UE through the SL DCI. Alternatively, for example, the base station may configure the information on the time offset to the transmitting UE through the MAC CE and/or the RRC signaling, and the base station may signal the information on the PUCCH resource index to the transmitting UE through the SL DCI. In this case, payloads of the SL DCI may be reduced. If the transmitting UE receives the information on the time offset, the transmitting UE may know/determine the slot related to the PUCCH resource. In addition, if the transmitting UE receives the information on the PUCCH resource index indicating/representing the frequency domain, the symbol domain, and/or the code domain of the PUCCH resource, the transmitting UE may know/determine the frequency domain, the symbol domain, and/or the code domain related to the PUCCH resource within the slot related to the PUCCH resource. For example, the symbol domain may include the start symbol and/or the symbol duration of the PUCCH resource, and the symbol domain may be signaled through an (additional) field defined in the SL DCI. In this case, the PUCCH resource index indicating/representing the frequency domain of the PUCCH resource may be, for example, a resource block index, and the PUCCH resource index indicating/representing the code domain of the PUCCH resource may be, for example, an orthogonal code index or an orthogonal cover code index.

Alternatively, the base station may allocate a specific symbol domain and/or a specific frequency domain as the PUCCH resource. In this case, if the transmitting UE receives the information on the time offset, the transmitting UE may know/determine the slot related to the PUCCH resource. In addition, the transmitting UE may know/determine that the specific symbol domain and/or the specific frequency domain on the specific symbol duration within the slot related to the PUCCH resource is allocated as the PUCCH resource. For example, the specific frequency domain and/or the specific symbol domain related to the PUCCH resource may be predefined for the UE. For example, the UE may determine the specific frequency domain and/or the specific symbol domain related to the PUCCH resource by using a predefined (implicit) rule.

Figure 15:
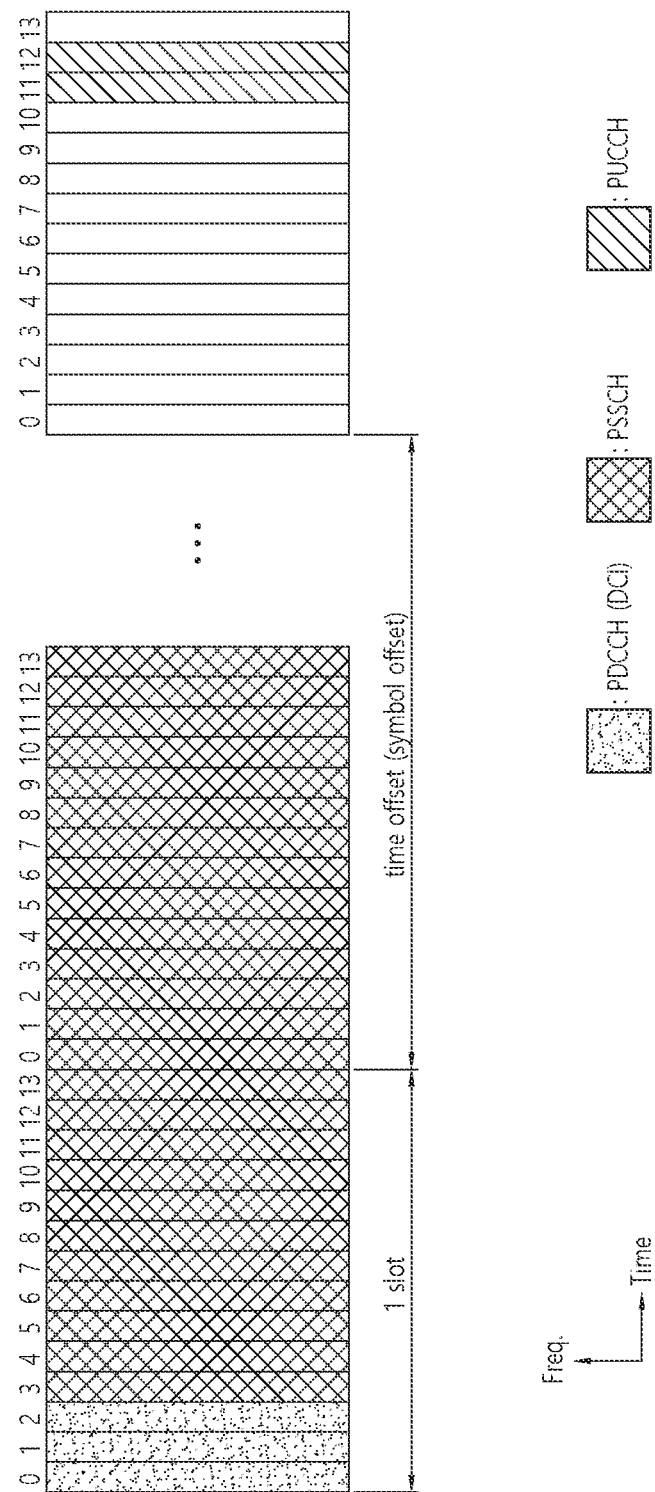
FIG. 15 shows an example of PUCCH resource allocation based on a slot unit offset, based on an embodiment of the present disclosure.

FIG. 15 shows an example of PUCCH resource allocation based on a slot unit offset, based on an embodiment of the present disclosure. The embodiment of FIG. 15 may be combined with various embodiments of the present disclosure.

Referring to FIG. 15, it is assumed that the reference timing point is a slot including the last symbol of the PSSCH resource, and it is assumed that the slot related to the PUCCH resource is a slot including the start symbol of the PUCCH resource or a slot including the last symbol of the PUCCH resource. In this case, the transmitting UE may receive the time offset from the base station and may know/determine the slot related to the PUCCH resource of the transmitting UE. Additionally, the transmitting UE may receive the information on the PUCCH resource index indicating/representing the frequency domain, the symbol domain, and/or the code domain of the PUCCH resource, and the transmitting UE may know/determine the frequency domain, the symbol domain, and/or the code domain related to the PUCCH resource within the slot related to the PUCCH resource. In this case, the PUCCH resource index indicating/ representing the frequency domain of the PUCCH resource may be, for example, a resource block index, and the PUCCH resource index indicating/representing the code domain of the PUCCH resource may be, for example, an orthogonal code index or an orthogonal cover code index.

Additionally, based on an embodiment of the present disclosure, information on the PUCCH resource indicated by the SL DCI may be independently signaled between initial transmission and retransmission through different fields. For example, in the embodiment of FIG. 13, in the case of the PUCCH resource allocation, a time offset related to initial transmission and a time offset related to retransmission may be independently signaled. Accordingly, the degree of freedom of the PUCCH resource allocation by the base station can be improved. Alternatively, information on the PUCCH resource indicated by the SL DCI may be commonly signaled between initial transmission and retransmission through one field. For example, in the embodiment of FIG. 13, in the case of the PUCCH resource allocation, a time offset related to initial transmission and a time offset related to retransmission may be commonly signaled. Accordingly, it is possible to prevent an increase in payloads of the SL DCI.

Referring back to FIG. 12, in step S1220, the transmitting UE may transmit sidelink information to the receiving UE through one or more PSCCHs and/or one or more PSSCHs.

In step S1230, the transmitting UE may receive SL HARQ feedback for the sidelink information from the receiving UE on the PSFCH resource determined by the various methods proposed in the present disclosure.

In step S1240, the transmitting UE may report information on SL HARQ feedback to the base station on the PUCCH resource determined by the various methods proposed in the present disclosure.

Figure 16:
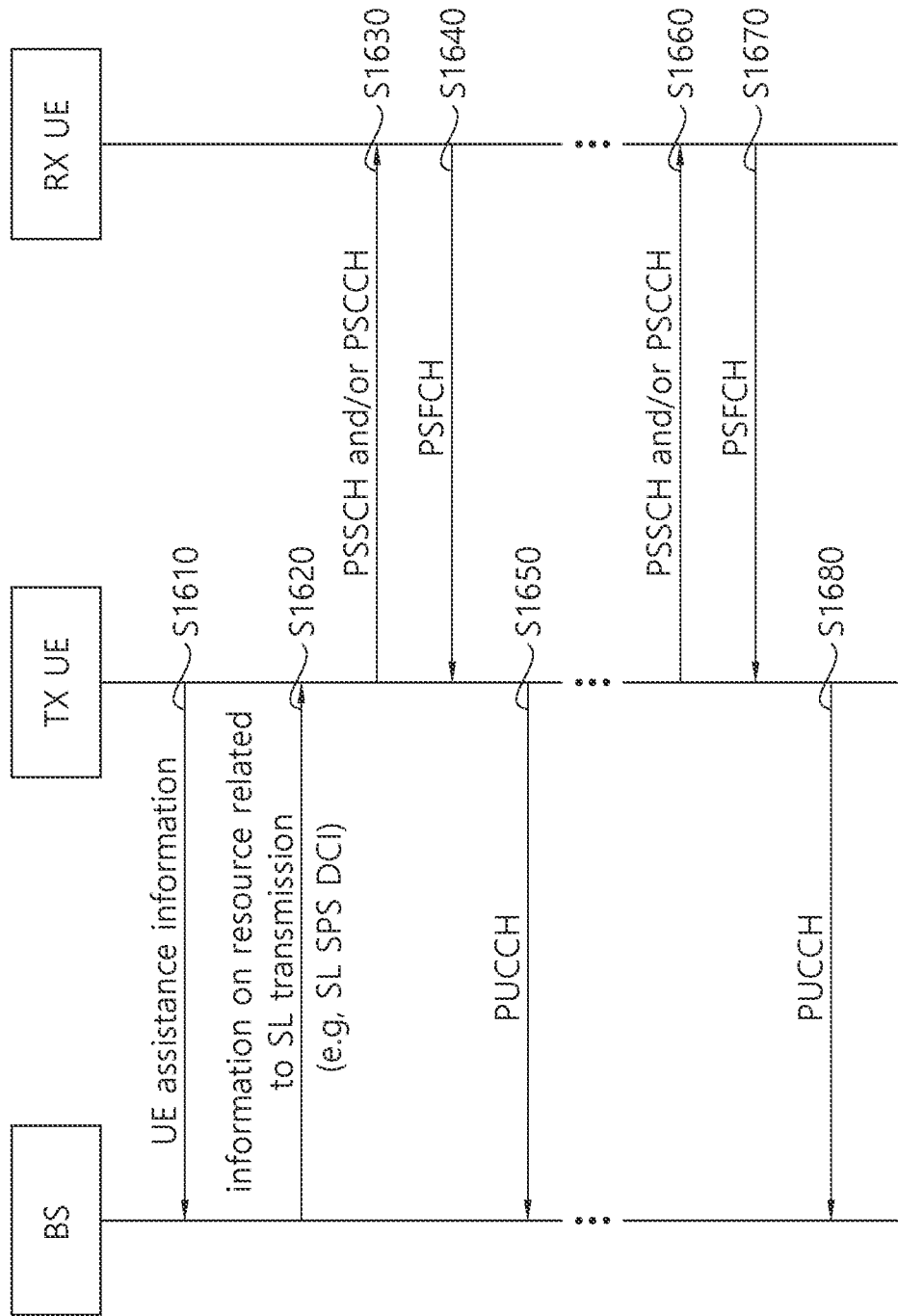
FIG. 16 shows a procedure for a transmitting UE to report information on SL HARQ feedback to a base station, based on an embodiment of the present disclosure.

FIG. 16 shows a procedure for a transmitting UE to report information on SL HARQ feedback to a base station, based on an embodiment of the present disclosure. The embodiment of FIG. 16 may be combined with various embodiments of the present disclosure.

Referring to FIG. 16, in step S1610, the transmitting UE may transmit UE assistance information to a base station. The UE assistance information may be information used by the base station to allocate (periodic) resources related to sidelink transmission to the transmitting UE. For example, the UE assistance information may include a period of traffic generated by the transmitting UE and/or the size of traffic generated by the transmitting UE.

In step S1620, the base station may transmit information on resources related to sidelink transmission to the transmitting UE. For example, the base station may allocate resources related to sidelink transmission to the transmitting UE. For example, the base station may allocate resources related to sidelink transmission to the transmitting UE based on the UE assistance information.

For example, the resources related to the sidelink transmission may include at least one of a sidelink transmission resource, a resource related to transmission/reception of SL HARQ feedback, and/or a SL HARQ feedback report resource. For example, the sidelink transmission resource may be one or more PSSCH resources and/or one or more PSCCH resources, the resource related to transmission/ reception of SL HARQ feedback may be a PSFCH resource, and the SL HARQ feedback report resource may be a PUCCH resource.

Based on an embodiment of the present disclosure, the base station may signal resource(s) related to sidelink transmission to the transmitting UE through a SL semi-persistent scheduling (SPS) DCI, and/or the base station may configure resource(s) related to sidelink transmission to the transmitting UE through RRC signaling or a MAC CE. For example, the SL SPS DCI may be a DCI for scheduling (periodic) sidelink transmission-related resources. For example, the SL SPS DCI may be a DCI for activating SL SPS resources or a DCI for releasing SL SPS resources. For example, the base station may (periodically) allocate an initial resource and/or retransmission resource(s) necessary for transmitting a plurality of packets based on the UE assistance information. For example, the base station may repeatedly allocate (periodic) resources for sidelink communication to the UE by using the SL SPS DCI. For example, the base station may repeatedly allocate (periodic) resources for sidelink communication to the UE by using the SL SPS DCI, as in the embodiment of FIG. 13. For example, the base station may repeatedly allocate (periodic) resources for sidelink communication to the UE by using the SL SPS DCI, as in the embodiment of FIG. 17. In the present disclosure, the SPS may be replaced with a configured grant.

Figure 17:
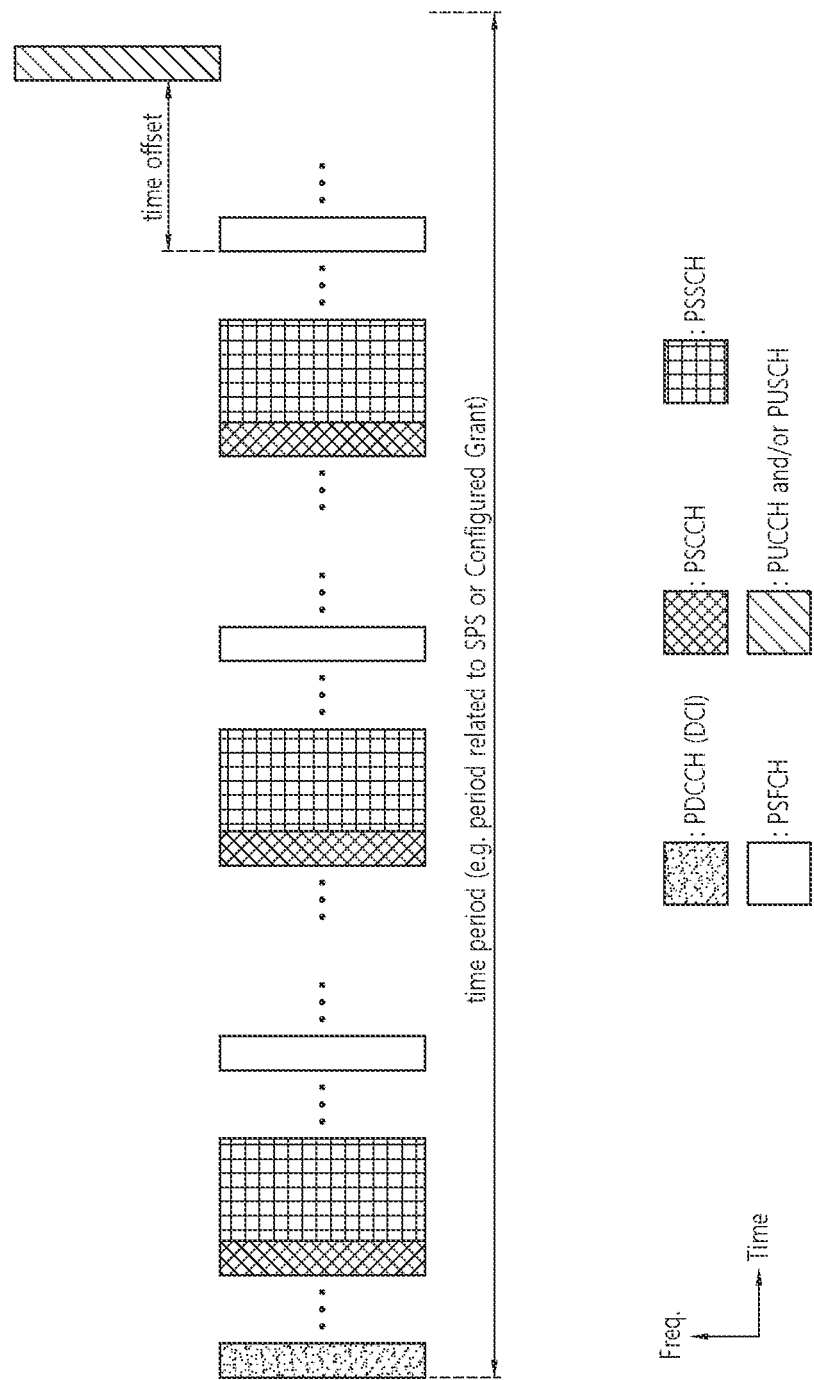
FIG. 17 shows an example of resource allocation based on an embodiment of the present disclosure.

FIG. 17 shows an example of resource allocation based on an embodiment of the present disclosure. The embodiment of FIG. 17 may be combined with various embodiments of the present disclosure.

Referring to FIG. 17, the base station may allocate periodic resources for SL communication and a resource for UL communication to the transmitting UE. For example, the periodic resources may be configured to the UE through an RRC message, and may be activated or deactivated through a DCI. For example, the periodic resources may be allocated to the UE through a DCI.

For example, the PUCCH resource may be allocated to the UE after a time offset from the last PSFCH resource in a period. For example, the PUCCH resource may be allocated to the UE after a time offset from a PSFCH resource related to the last PSSCH resource among a plurality of PSSCH resources within a period. For example, if a slot offset between the PSFCH resource and the PUCCH resource is K slots, and the PSFCH resource related to the last PSSCH resource in the period is in the M-th slot, the PUCCH resource for reporting SL HARQ feedback may be allocated in the (M+K)-th slot. In this case, the UE may report one SL HARQ feedback to the base station by using the PUCCH resource in the (M+K)-th slot. That is, if the UE receives a plurality of SL HARQ feedbacks in response to a plurality of PSSCHs transmitted within a period, the UE may generate one HARQ feedback based on the plurality of SL HARQ feedbacks, and the UE may transmit one HARQ feedback to the base station based on the PUCCH resource (e.g., a PUCCH resource located after a time offset from a PSFCH resource related to the last PSSCH resource within a period). Methods for the allocation of PSCCH resources, the allocation of PSSCH resources, the allocation of PUCCH resources and the allocation of PSFCH resources have already been described in detail with reference to FIGS. 12 to 15, and thus will be omitted. Methods for the allocation of PSCCH resources, the allocation of PSSCH resources, the allocation of PUCCH resources and the allocation of PSFCH resources may also be applied to the embodiment of FIG. 16.

In step S1630, the transmitting UE may transmit sidelink information to a receiving UE through one or more PSCCHs and/or one or more PSSCHs.

In step S1640, the transmitting UE may receive SL HARQ feedback for the sidelink information from the receiving UE on a PSFCH resource determined by the various methods proposed in the present disclosure.

In step S1650, the transmitting UE may report information on SL HARQ feedback to the base station on a PUCCH resource determined by the various methods proposed in the present disclosure.

Additionally, until the base station releases resources related to sidelink transmission, the transmitting UE may repeatedly perform operations S1630 to S1650. For example, the transmitting UE may repeatedly perform operations S1630 to S1650 until the base station releases resources related to sidelink transmission through the SL SPS DCI. For example, in step S1660, the transmitting UE may transmit sidelink information to the receiving UE through one or more PSCCHs and/or one or more PSSCHs. In step S1670, the transmitting UE may receive SL HARQ feedback for the sidelink information from the receiving UE on a PSFCH resource determined by the various methods proposed in the present disclosure. In step S1680, the transmitting UE may report information on SL HARQ feedback to the base station on a PUCCH resource determined by the various methods proposed in the present disclosure.

Based on an embodiment of the present disclosure, the base station can efficiently allocate PUCCH resource(s) for reporting information on SL HARQ feedback to the base station.

Figure 18:
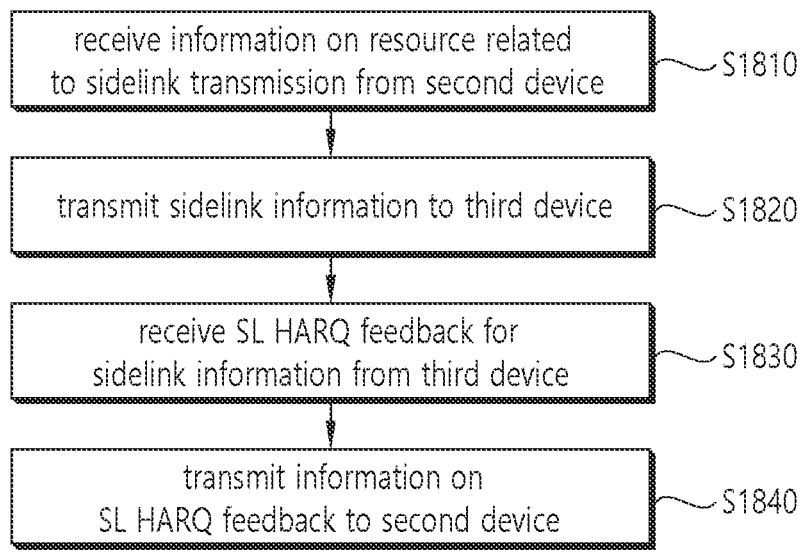
FIG. 18 shows a method for a first device to report information on SL HARQ feedback to a second device, based on an embodiment of the present disclosure.

FIG. 18 shows a method for a first device to report information on SL HARQ feedback to a second device, based on an embodiment of the present disclosure. The embodiment of FIG. 18 may be combined with various embodiments of the present disclosure.

Referring to FIG. 18, in step S1810, the first device may receive information on resource(s) related to sidelink transmission from the second device. For example, information on resource(s) related to sidelink transmission may include at least one of information on PSSCH resource(s), information on PSCCH resource(s), information on PFSCH resource(s), and/or information on PUCCH resource(s). For example, the second device may be a base station.

In step S1820, the first device may transmit sidelink information to a third device. For example, the third device may be at least one of devices 100, 200, 100a, 100b, 100c, 100d, 100e, 100f described with reference to FIG. 22 and/or FIGS. 23 to 27.

In step S1830, the first device may receive SL HARQ feedback for the sidelink information from the third device.

In step S1840, the first device may transmit information on SL HARQ feedback to the second device. For example, the first device may transmit information on SL HARQ feedback to the second device by using a PUCCH resource determined based on various embodiments proposed in the present disclosure.

Figure 19:
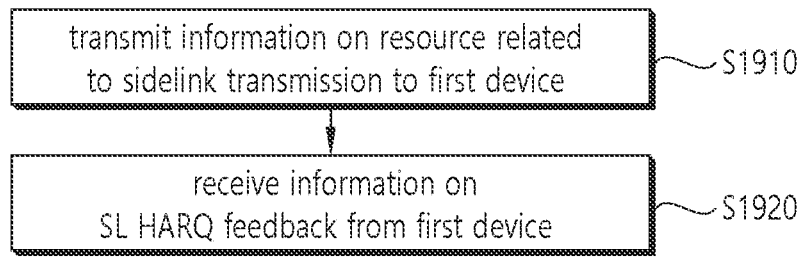
FIG. 19 shows a method for a second device to receive information on SL HARQ feedback from a first device, based on an embodiment of the present disclosure.

FIG. 19 shows a method for a second device to receive information on SL HARQ feedback from a first device, based on an embodiment of the present disclosure. The embodiment of FIG. 19 may be combined with various embodiments of the present disclosure.

Referring to FIG. 19, in step S1910, the second device may transmit information on resource(s) related to sidelink transmission to the first device. For example, information on resource(s) related to sidelink transmission may include at least one of information on PSSCH resource(s), information on PSCCH resource(s), information on PFSCH resource(s), and/or information on PUCCH resource(s).

In step S1920, the second device may receive information on SL HARQ feedback from the first device. For example, the second device may receive information on SL HARQ feedback from the first device on a PUCCH resource determined by various embodiments proposed in the present disclosure.

Figure 20:
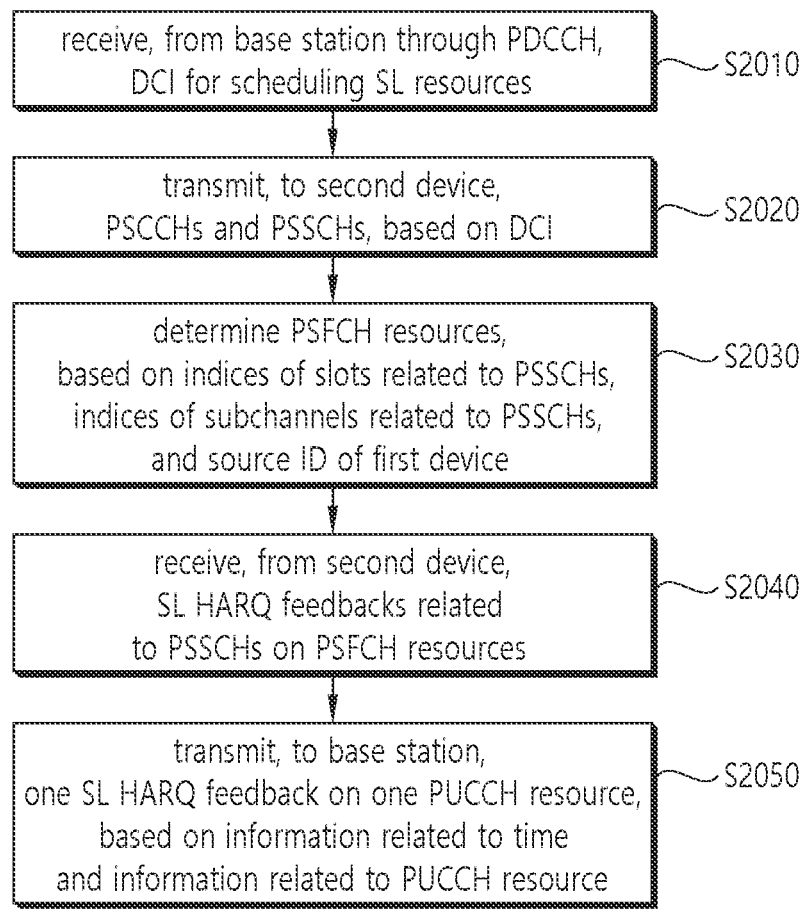
FIG. 20 shows a method for a first device to perform wireless communication, based on an embodiment of the present disclosure.

FIG. 20 shows a method for a first device to perform wireless communication, based on an embodiment of the present disclosure. The embodiment of FIG. 20 may be combined with various embodiments of the present disclosure.

Referring to FIG. 20, in step S2010, the first device may receive, from a base station through a physical downlink control channel (PDCCH), a downlink control information (DCI) for scheduling sidelink (SL) resources. Herein, the DCI may include information related to a time between a physical sidelink feedback channel (PSFCH) resource and a physical uplink control channel (PUCCH) resource and information related to the PUCCH resource. In step S2020, the first device may transmit, to a second device, a plurality of physical sidelink control channels (PSCCHs) and a plurality of physical sidelink shared channels (PSSCHs), based on the DCI. In step S2030, the first device may determine a plurality of PSFCH resources, based on indices of slots related to the plurality of PSSCHs, indices of subchannels related to the plurality of PSSCHs, and a source ID of the first device. In step S2040, the first device may receive, from the second device, a plurality of SL hybrid automatic repeat request (HARQ) feedbacks related to the plurality of PSSCHs on the plurality of PSFCH resources. In step S2050, the first device may transmit, to the base station, one SL HARQ feedback on one PUCCH resource, based on the information related to the time and the information related to the PUCCH resource. For example, the one PUCCH resource may be allocated after a last PSFCH resource among the plurality of PSFCH resources.

For example, the plurality of PSCCHs and the plurality of PSSCHs may be transmitted within a time period. For example, the last PSFCH resource may be a PSFCH resource related to a resource for a last PSSCH among resources for the plurality of PSSCHs within the time period. For example, the one PUCCH resource may be in a slot after the time from the last PSFCH resource.

For example, the SL resources may be allocated periodically for the first device. For example, the DCI may include information for activation of the SL resources.

For example, the information related to the time may be information related to a number of slots between the one PUCCH resource and the last PSFCH resource among the plurality of PSFCH resources. Additionally, for example, the first device may determine a slot including the one PUCCH resource, based on the information related to the time, and the first device may determine at least one of a frequency domain, a symbol domain, or a code domain of the one PUCCH resource in the slot, based on the information related to the PUCCH resource.

For example, the information related to the time may be information related to a number of symbols between the one PUCCH resource and the last PSFCH resource among the plurality of PSFCH resources. Additionally, for example, the first device may determine a symbol including the one PUCCH resource, based on the information related to the time, and the first device may determine at least one of a frequency domain or a code domain of the one PUCCH resource in the symbol, based on the information related to the PUCCH resource.

Additionally, for example, the first device may generate the one SL HARQ feedback based on the plurality of SL HARQ feedbacks. For example, the generated one SL HARQ feedback may be ACK based on the plurality of SL HARQ feedbacks including NACK and ACK. For example, the generated one SL HARQ feedback may be NACK based on the plurality of SL HARQ feedbacks including only NACK.

The proposed method can be applied to device(s) described below. First, the processor (102) of the first device (100) may control the transceiver (106) to receive, from a base station through a physical downlink control channel (PDCCH), a downlink control information (DCI) for scheduling sidelink (SL) resources. Herein, the DCI may include information related to a time between a physical sidelink feedback channel (PSFCH) resource and a physical uplink control channel (PUCCH) resource and information related to the PUCCH resource. In addition, the processor (102) of the first device (100) may control the transceiver (106) to transmit, to a second device, a plurality of physical sidelink control channels (PSCCHs) and a plurality of physical sidelink shared channels (PSSCHs), based on the DCI. In addition, the processor (102) of the first device (100) may determine a plurality of PSFCH resources, based on indices of slots related to the plurality of PSSCHs, indices of subchannels related to the plurality of PSSCHs, and a source ID of the first device. In addition, the processor (102) of the first device (100) may control the transceiver (106) to receive, from the second device, a plurality of SL hybrid automatic repeat request (HARQ) feedbacks related to the plurality of PSSCHs on the plurality of PSFCH resources. In addition, the processor (102) of the first device (100) may control the transceiver (106) to transmit, to the base station, one SL HARQ feedback on one PUCCH resource, based on the information related to the time and the information related to the PUCCH resource. For example, the one PUCCH resource may be allocated after a last PSFCH resource among the plurality of PSFCH resources.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station through a physical downlink control channel (PDCCH), a downlink control information (DCI) for scheduling sidelink (SL) resources, wherein the DCI includes information related to a time between a physical sidelink feedback channel (PSFCH) resource and a physical uplink control channel (PUCCH) resource and information related to the PUCCH resource; transmit, to a second device, a plurality of physical sidelink control channels (PSCCHs) and a plurality of physical sidelink shared channels (PSSCHs), based on the DCI; determining a plurality of PSFCH resources, based on indices of slots related to the plurality of PSSCHs, indices of subchannels related to the plurality of PSSCHs, and a source ID of the first device; receive, from the second device, a plurality of SL hybrid automatic repeat request (HARQ) feedbacks related to the plurality of PSSCHs on the plurality of PSFCH resources; and transmit, to the base station, one SL HARQ feedback on one PUCCH resource, based on the information related to the time and the information related to the PUCCH resource. For example, the one PUCCH resource may be allocated after a last PSFCH resource among the plurality of PSFCH resources.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive, from a base station through a physical downlink control channel (PDCCH), a downlink control information (DCI) for scheduling sidelink (SL) resources, wherein the DCI includes information related to a time between a physical sidelink feedback channel (PSFCH) resource and a physical uplink control channel (PUCCH) resource and information related to the PUCCH resource; transmit, to a second UE, a plurality of physical sidelink control channels (PSCCHs) and a plurality of physical sidelink shared channels (PSSCHs), based on the DCI; determining a plurality of PSFCH resources, based on indices of slots related to the plurality of PSSCHs, indices of subchannels related to the plurality of PSSCHs, and a source ID of the first UE; receive, from the second UE, a plurality of SL hybrid automatic repeat request (HARQ) feedbacks related to the plurality of PSSCHs on the plurality of PSFCH resources; and transmit, to the base station, one SL HARQ feedback on one PUCCH resource, based on the information related to the time and the information related to the PUCCH resource. For example, the one PUCCH resource may be allocated after a last PSFCH resource among the plurality of PSFCH resources.

Based on an embodiment of the present disclosure, a non-transitory computer-readable storage medium storing instructions may be provided. For example, the instructions, when executed, may cause a first device to: receive, from a base station through a physical downlink control channel (PDCCH), a downlink control information (DCI) for scheduling sidelink (SL) resources, wherein the DCI includes information related to a time between a physical sidelink feedback channel (PSFCH) resource and a physical uplink control channel (PUCCH) resource and information related to the PUCCH resource; transmit, to a second device, a plurality of physical sidelink control channels (PSCCHs) and a plurality of physical sidelink shared channels (PSSCHs), based on the DCI; determining a plurality of PSFCH resources, based on indices of slots related to the plurality of PSSCHs, indices of subchannels related to the plurality of PSSCHs, and a source ID of the first device; receive, from the second device, a plurality of SL hybrid automatic repeat request (HARQ) feedbacks related to the plurality of PSSCHs on the plurality of PSFCH resources; and transmit, to the base station, one SL HARQ feedback on one PUCCH resource, based on the information related to the time and the information related to the PUCCH resource. For example, the one PUCCH resource may be allocated after a last PSFCH resource among the plurality of PSFCH resources.

Figure 21:
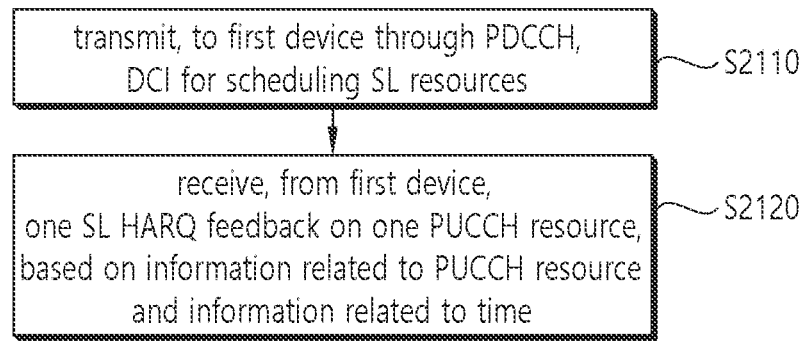
FIG. 21 shows a method for a base station to perform wireless communication, based on an embodiment of the present disclosure.

FIG. 21 shows a method for a base station to perform wireless communication, based on an embodiment of the present disclosure. The embodiment of FIG. 21 may be combined with various embodiments of the present disclosure.

Referring to FIG. 21, in step S2110, the base station may transmit, to a first device through a physical downlink control channel (PDCCH), a downlink control information (DCI) for scheduling sidelink (SL) resources. Herein, the DCI may include information related to a time between a physical sidelink feedback channel (PSFCH) resource and a physical uplink control channel (PUCCH) resource and information related to the PUCCH resource. In step S2120, the base station may receive, from the first device, one SL hybrid automatic repeat request (HARQ) feedback on one PUCCH resource, based on the information related to the PUCCH resource and the information related to the time. For example, the one PUCCH resource may be allocated after a last PSFCH resource among a plurality of PSFCH resources.

The proposed method can be applied to device(s) described below. First, the processor (202) of the base station (200) may control the transceiver (206) to transmit, to a first device through a physical downlink control channel (PDCCH), a downlink control information (DCI) for scheduling sidelink (SL) resources. Herein, the DCI may include information related to a time between a physical sidelink feedback channel (PSFCH) resource and a physical uplink control channel (PUCCH) resource and information related to the PUCCH resource. In addition, the processor (202) of the base station (200) may control the transceiver (206) to receive, from the first device, one SL hybrid automatic repeat request (HARQ) feedback on one PUCCH resource, based on the information related to the PUCCH resource and the information related to the time. For example, the one PUCCH resource may be allocated after a last PSFCH resource among a plurality of PSFCH resources.

Based on an embodiment of the present disclosure, a base station configured to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device through a physical downlink control channel (PDCCH), a downlink control information (DCI) for scheduling sidelink (SL) resources, wherein the DCI includes information related to a time between a physical sidelink feedback channel (PSFCH) resource and a physical uplink control channel (PUCCH) resource and information related to the PUCCH resource; and receive, from the first device, one SL hybrid automatic repeat request (HARQ) feedback on one PUCCH resource, based on the information related to the PUCCH resource and the information related to the time. For example, the one PUCCH resource may be allocated after a last PSFCH resource among a plurality of PSFCH resources.

Based on an embodiment of the present disclosure, an apparatus configured to control a base station may be provided. For example, the apparatus may comprise: one or more processors; and one or more memories operably connected to the one or more processors and storing instructions. For example, the one or more processors may execute the instructions to: transmit, to a first user equipment (UE) through a physical downlink control channel (PDCCH), a downlink control information (DCI) for scheduling sidelink (SL) resources, wherein the DCI includes information related to a time between a physical sidelink feedback channel (PSFCH) resource and a physical uplink control channel (PUCCH) resource and information related to the PUCCH resource; and receive, from the first UE, one SL hybrid automatic repeat request (HARQ) feedback on one PUCCH resource, based on the information related to the PUCCH resource and the information related to the time. For example, the one PUCCH resource may be allocated after a last PSFCH resource among a plurality of PSFCH resources.

Based on an embodiment of the present disclosure, a non-transitory computer-readable storage medium storing instructions may be provided. For example, the instructions, when executed, may cause a base station to: transmit, to a first device through a physical downlink control channel (PDCCH), a downlink control information (DCI) for scheduling sidelink (SL) resources, wherein the DCI includes information related to a time between a physical sidelink feedback channel (PSFCH) resource and a physical uplink control channel (PUCCH) resource and information related to the PUCCH resource; and receive, from the first device, one SL hybrid automatic repeat request (HARQ) feedback on one PUCCH resource, based on the information related to the PUCCH resource and the information related to the time. For example, the one PUCCH resource may be allocated after a last PSFCH resource among a plurality of PSFCH resources.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
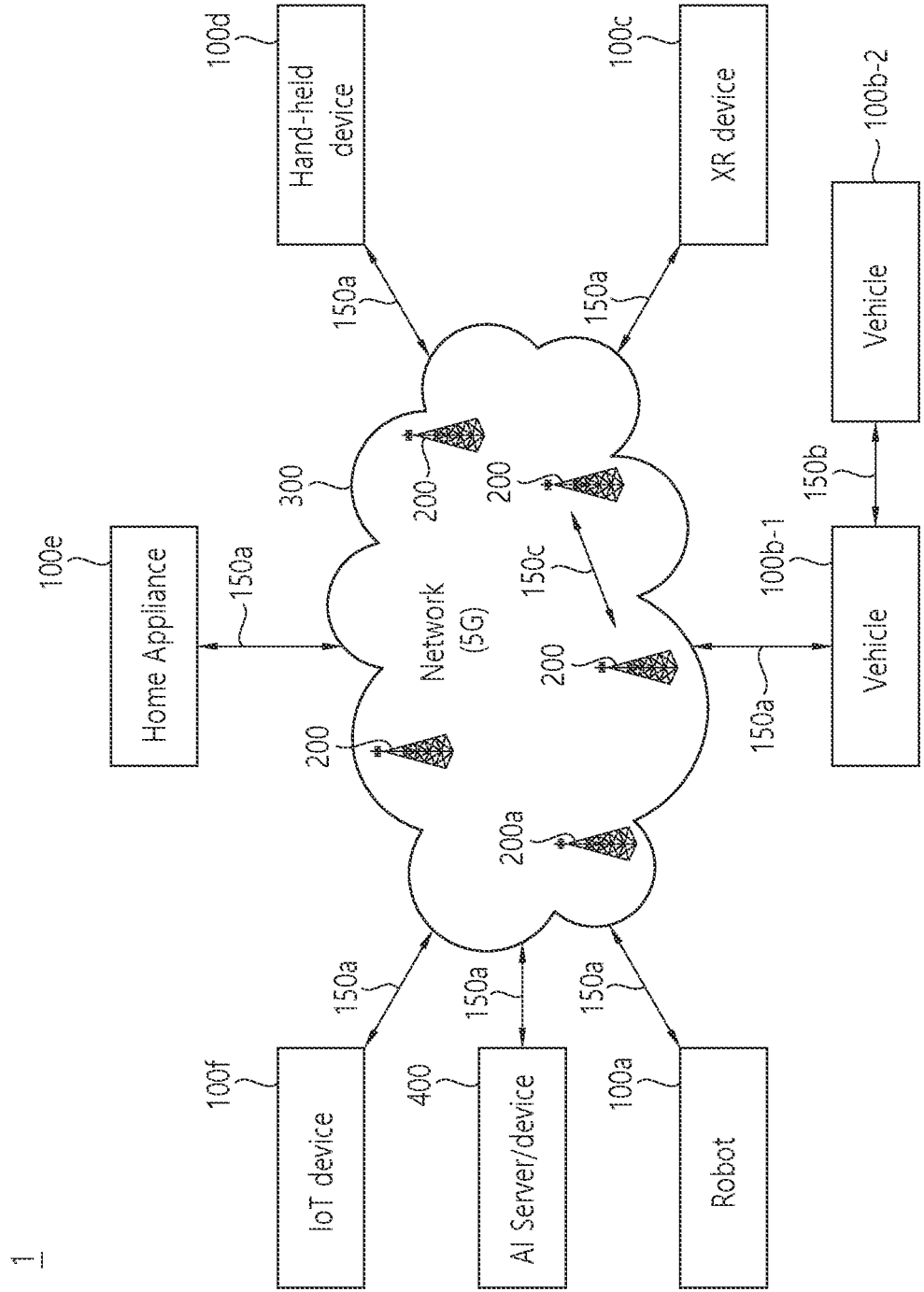
FIG. 22 shows a communication system 1, based on an embodiment of the present disclosure.

FIG. 22 shows a communication system 1, based on an embodiment of the present disclosure.

Referring to FIG. 22, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100$a$, vehicles 100$b$-1 and 100$b$-2, an eXtended Reality (XR) device 100$c$, a hand-held device 100$d$, a home appliance 100$e$, an Internet of Things (IoT) device 100$f$, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR) Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200$a$ may operate as a BS/network node with respect to other wireless devices.

Here, wireless communication technology implemented in wireless devices 100$a$ to 100$f$ of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100$a$ to 100$f$ of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100$a$ to 100$f$ of the present disclosure may include at least one of Bluetooth. Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100$a$ to 100$f$ may be connected to the network 300 via the BSs 200. An AI technology may be applied to the wireless devices 100$a$ to 100$f$ and the wireless devices 100$a$ to 100$f$ may be connected to the AI server 400 via the network 300. The network 300 may be configured using a 3G network, a 4G (e.g., LTE) network, or a 5G (e.g., NR) network. Although the wireless devices 100$a$ to 100$f$ may communicate with each other through the BSs 2001/network 300, the wireless devices 100$a$ to 100$f$ may perform direct communication (e.g., sidelink communication) with each other without passing through the BSs/network. For example, the vehicles 100$b$-1 and 100$b$-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100$a$ to 100$f$.

Wireless communication/connections 150$a$, 150$b$, or 150$c$ may be established between the wireless devices 100$a$ to 100$f$/BS 200, or BS 200/BS 200. Herein, the wireless communication/connections may be established through various RATs (e.g., 5G NR) such as uplink/downlink communication 150$a$, sidelink communication 150$b$ (or, D2D communication), or inter BS communication (e.g., relay, Integrated Access Backhaul (IAB)). The wireless devices and the BSs/the wireless devices may transmit/receive radio signals to/from each other through the wireless communication/connections 150$a$ and 150$b$. For example, the wireless communication/connections 150$a$ and 150$b$ may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
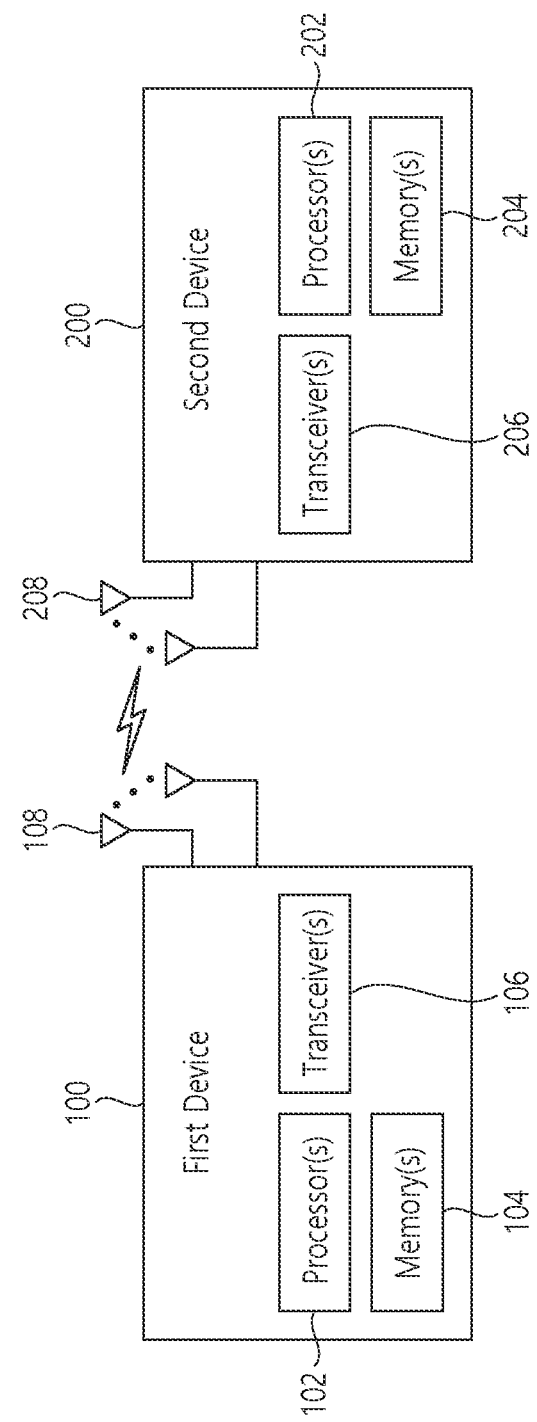
FIG. 23 shows wireless devices, based on an embodiment of the present disclosure.

FIG. 23 shows wireless devices, based on an embodiment of the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 24:
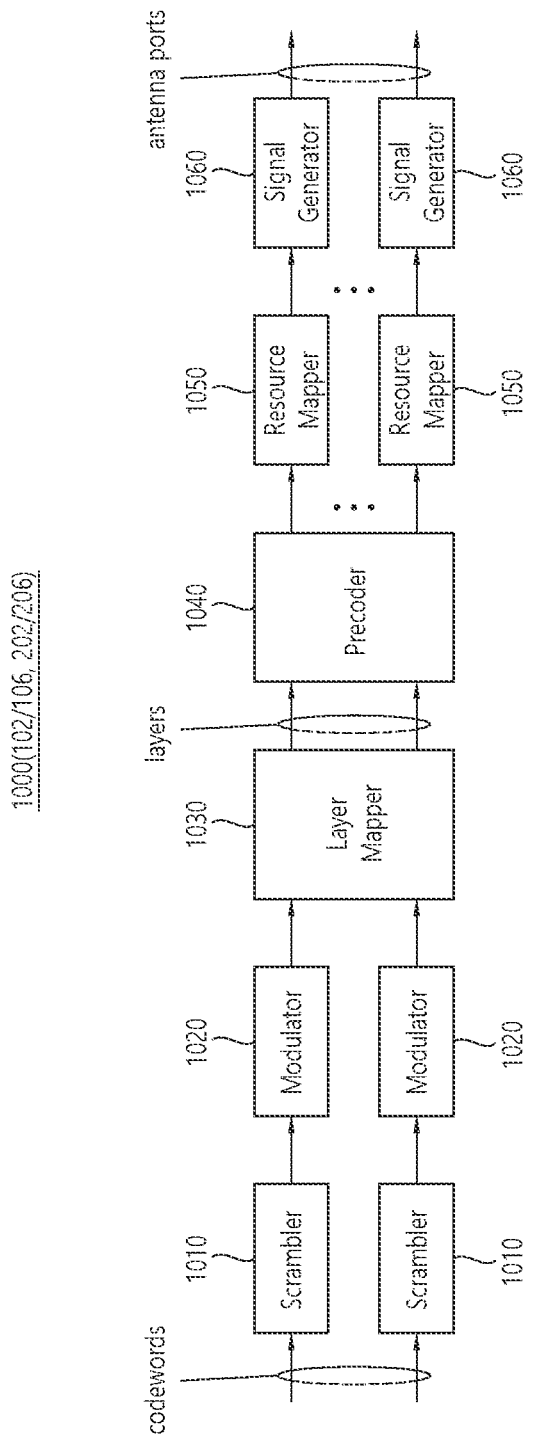
FIG. 24 shows a signal process circuit for a transmission signal, based on an embodiment of the present disclosure.

FIG. 24 shows a signal process circuit for a transmission signal, based on an embodiment of the present disclosure.

Referring to FIG. 24, a signal processing circuit 1000 may include scramblers 1010, modulators 1020, a layer mapper 1030, a precoder 1040, resource mappers 1050, and signal generators 1060. An operation/function of FIG. 24 may be performed, without being limited to, the processors 102 and 202 and/or the transceivers 106 and 206 of FIG. 23. Hardware elements of FIG. 24 may be implemented by the processors 102 and 202 and/or the transceivers 106 and 206 of FIG. 23. For example, blocks 1010 to 1060 may be implemented by the processors 102 and 202 of FIG. 23. Alternatively, the blocks 1010 to 1050 may be implemented by the processors 102 and 202 of FIG. 23 and the block 1060 may be implemented by the transceivers 106 and 206 of FIG. 23.

Codewords may be converted into radio signals via the signal processing circuit 1000 of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 24. For example, the wireless devices (e.g., 100 and 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
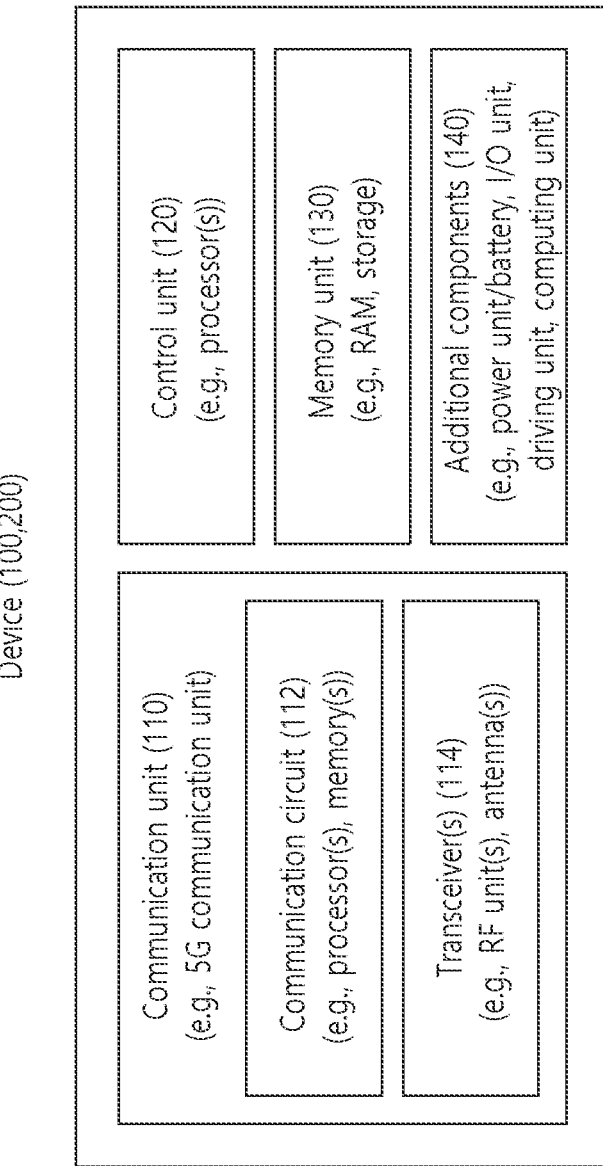
FIG. 25 shows another example of a wireless device, based on an embodiment of the present disclosure.

FIG. 25 shows another example of a wireless device, based on an embodiment of the present disclosure. The wireless device may be implemented in various forms according to a use-case/service (refer to FIG. 22).

Referring to FIG. 25, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (000d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
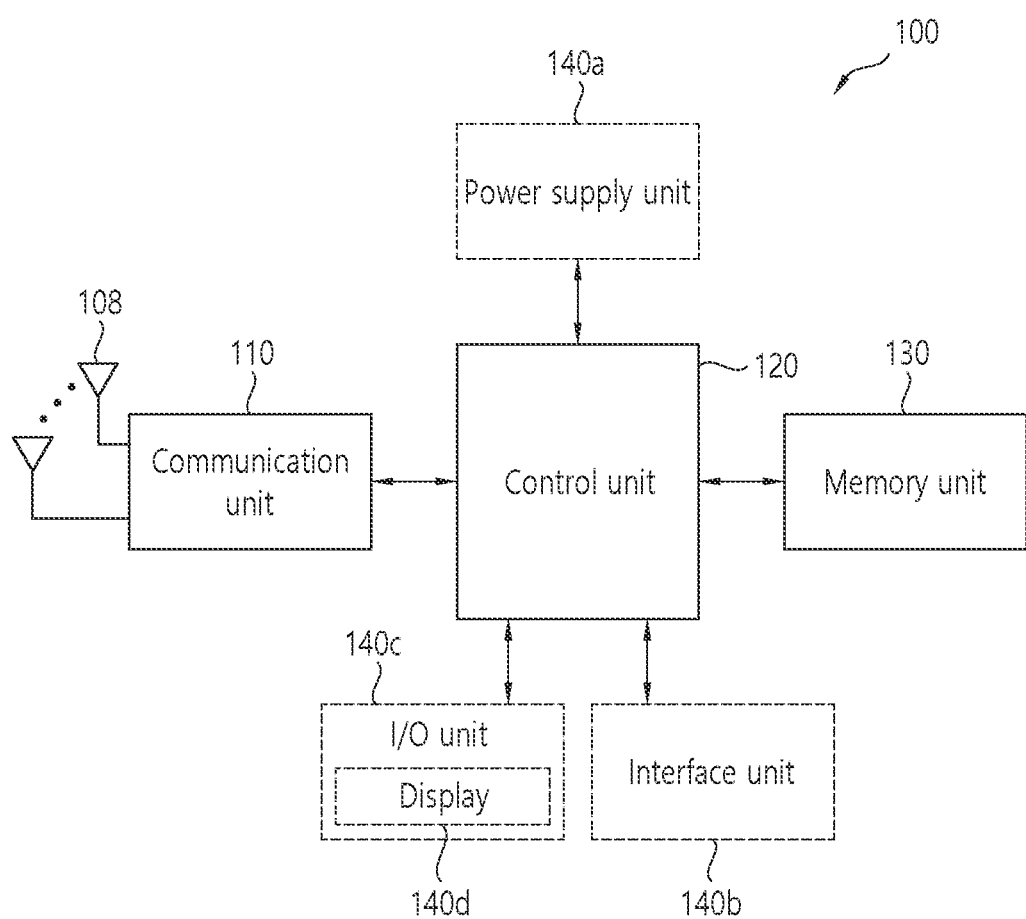
FIG. 26 shows a hand-held device, based on an embodiment of the present disclosure.

FIG. 26 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 25, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 27:
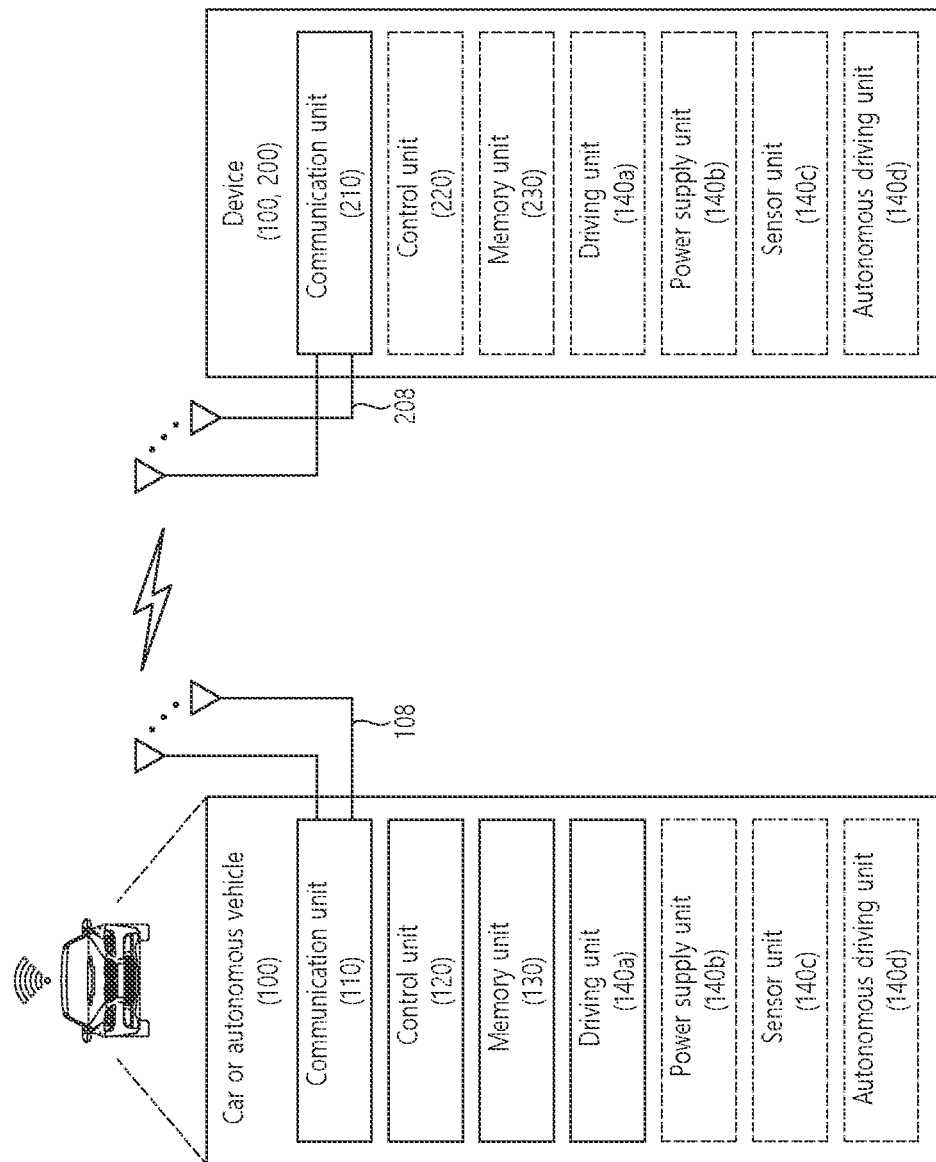
FIG. 27 shows a vehicle or an autonomous vehicle, based on an embodiment of the present disclosure.

FIG. 27 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 27, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a base station, the method comprising:
    transmitting, to a device through a physical downlink control channel (PDCCH), a downlink control information (DCI) for scheduling of sidelink (SL),
    wherein the DCI includes information related to a plurality of resources for physical sidelink shared channel (PSSCH) transmission, information related to a time between a physical sidelink feedback channel (PSFCH) resource and a physical uplink control channel (PUCCH) resource and information related to the PUCCH resource; and
    receiving, from the device, one SL hybrid automatic repeat request (HARQ) feedback on one PUCCH resource, based on the information related to the time and the information related to the PUCCH resource,
    wherein a plurality of PSFCH resources are determined based on indices of slots related to the plurality of resources, indices of subchannels related to the plurality of resources, and a source identifier (ID) of the device, and
    wherein the one PUCCH resource is allocated after a last PSFCH resource among the plurality of PSFCH resources.

2. The method of claim 1, wherein the plurality of resources for PSSCH transmission are within a time period.

3. The method of claim 2, wherein the last PSFCH resource is a PSFCH resource related to a resource for a last PSSCH transmission among the plurality of resources for PSSCH transmission within the time period.

4. The method of claim 3, wherein the one PUCCH resource is in a slot after the time from the last PSFCH resource.

5. The method of claim 1, wherein the plurality of resources are allocated periodically for the device.

6. The method of claim 1, wherein the DCI includes information for activation of the plurality of resources.

7. The method of claim 1, wherein the information related to the time is information related to a number of slots between the one PUCCH resource and the last PSFCH resource among the plurality of PSFCH resources.

8. The method of claim 7, further comprising:
    determining a slot including the one PUCCH resource, based on the information related to the time; and
    determining at least one of a frequency domain, a symbol domain, or a code domain of the one PUCCH resource in the slot, based on the information related to the PUCCH resource.

9. The method of claim 1, wherein the information related to the time is information related to a number of symbols between the one PUCCH resource and the last PSFCH resource among the plurality of PSFCH resources.

10. The method of claim 9, further comprising:
    determining a symbol including the one PUCCH resource, based on the information related to the time; and
    determining at least one of a frequency domain or a code domain of the one PUCCH resource in the symbol, based on the information related to the PUCCH resource.

11. A base station adapted to perform wireless communication, the base station comprising:
    one or more memories storing instructions;
    one or more transceivers; and
    one or more processors connected to the one or more memories and the one or more transceivers, wherein the one or more processors execute the instructions to:
    control the one or more transceivers to transmit, to a device through a physical downlink control channel (PDCCH), a downlink control information (DCI) for scheduling of sidelink (SL),
    wherein the DCI includes information related to a plurality of resources for physical sidelink shared channel (PSSCH) transmission, information related to a time between a physical sidelink feedback channel (PSFCH) resource and a physical uplink control channel (PUCCH) resource and information related to the PUCCH resource; and
    control the one or more transceivers to receive, from the device, one SL hybrid automatic repeat request (HARQ) feedback on one PUCCH resource, based on the information related to the time and the information related to the PUCCH resource,
    wherein a plurality of PSFCH resources are determined based on indices of slots related to the plurality of resources, indices of subchannels related to the plurality of resources, and a source identifier (ID) of the device, and wherein the one PUCCH resource is allocated after a last PSFCH resource among the plurality of PSFCH resources.

12. The base station of claim 11, wherein the plurality of resources for PSSCH transmission are within a time period.

13. The base station of claim 12, wherein the last PSFCH resource is a PSFCH resource related to a resource for a last PSSCH transmission among the plurality of resources for PSSCH transmission within the time period.

14. The base station of claim 13, wherein the one PUCCH resource is in a slot after the time from the last PSFCH resource.

15. The base station of claim 11, wherein the plurality of resources are allocated periodically for the device.

16. The base station of claim 11, wherein the DCI includes information for activation of the plurality of resources.

17. The base station of claim 11, wherein the information related to the time is information related to a number of slots between the one PUCCH resource and the last PSFCH resource among the plurality of PSFCH resources.

18. The base station of claim 17, wherein the one or more processors further execute the instructions to: determine a slot including the one PUCCH resource, based on the information related to the time; and determine at least one of a frequency domain, a symbol domain, or a code domain of the one PUCCH resource in the slot, based on the information related to the PUCCH resource.

19. The base station of claim 11, wherein the information related to the time is information related to a number of symbols between the one PUCCH resource and the last PSFCH resource among the plurality of PSFCH resources.

20. A method for performing wireless communication by a device, the method comprising:

receiving, from a base station through a physical downlink control channel (PDCCH), a downlink control information (DCI) for scheduling of sidelink, wherein the DCI includes information related to a set of resources for physical sidelink shared channel (PSSCH) transmission, physical sidelink feedback channel (PSFCH)-to-hybrid automatic repeat request (HARQ) feedback timing information and physical uplink control channel (PUCCH) resource information;

determining a plurality of PSFCH resources, based on indices of slots related to the set of resources, indices of subchannels related to the set of resources, and a source identifier (ID) of the device; and generating one sidelink HARQ-ACK information bit related to the plurality of PSFCH resources to multiplex in a PUCCH transmission occasion that is after a last time resource in the set of resources; and reporting, to the base station, the one SL HARQ-ACK information bit in the PUCCH transmission occasion, based on the PSFCH-to-HARQ feedback timing information and the PUCCH resource information.

* * * * *